United States Patent
Katagiri

(10) Patent No.: US 7,525,579 B2
(45) Date of Patent: Apr. 28, 2009

(54) IMAGE SENSING APPARATUS AND IMAGE PROCESSING METHOD FOR USE THEREIN

(75) Inventor: Tetsuya Katagiri, Kyoto (JP)

(73) Assignee: Konica Minolta Holdings, Inc., Tokyo (JP)

( * ) Notice: Subject to any disclaimer, the term of this patent is extended or adjusted under 35 U.S.C. 154(b) by 530 days.

(21) Appl. No.: 11/318,009

(22) Filed: Dec. 23, 2005

(65) Prior Publication Data
US 2006/0158529 A1 Jul. 20, 2006

(30) Foreign Application Priority Data
Dec. 27, 2004 (JP) .............................. 2004-377875

(51) Int. Cl.
*H04N 9/68* (2006.01)
*H04N 5/222* (2006.01)

(52) U.S. Cl. ................. 348/234; 348/370; 348/222.1; 348/296; 348/297; 348/308; 348/349

(58) Field of Classification Search .............. 348/370, 348/371, 234, 235, 222.1
See application file for complete search history.

(56) References Cited

U.S. PATENT DOCUMENTS

| 6,191,408 B1 * | 2/2001 | Shinotsuka et al. ...... 250/208.1 |
| 6,927,884 B2 | 8/2005 | Takada et al. ............... 358/513 |
| 2003/0156761 A1 * | 8/2003 | Ogata et al. ................. 382/251 |

OTHER PUBLICATIONS

"Image Dynamic Range Compression Techniques", Image Lab, Jun. 2004, pp. 24-28 (with partial English translation).

* cited by examiner

*Primary Examiner*—Ngoc-Yen T Vu
*Assistant Examiner*—Joel Fosselman
(74) *Attorney, Agent, or Firm*—Sidley Austin LLP

(57) ABSTRACT

An illumination-component extractor (illumination component extraction section) extracts an illumination component Log from a picked-up image (original image picked up an image sensor having a photoelectric conversion characteristic which comprises a linear characteristic region and a logarithmic characteristic region. A reflectance component determiner (subtraction section) extracts a reflectance component Log (R1). A compressor (illumination component compression section) subjects at least the illumination component Log of the logarithmic characteristic region to DR compression. Image production mean (image production section) produces a new image (synthetic image) based on the DR-compress illumination component and the reflectance component.

18 Claims, 22 Drawing Sheets

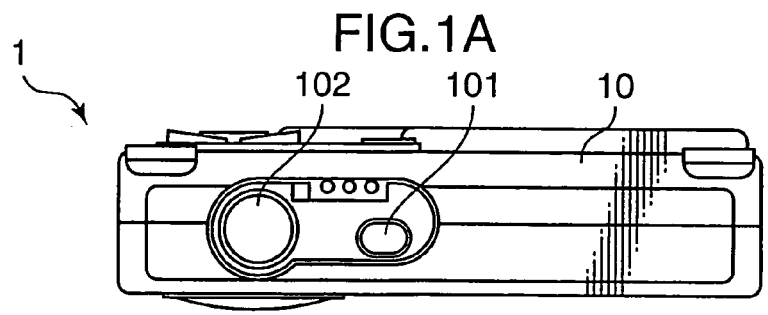
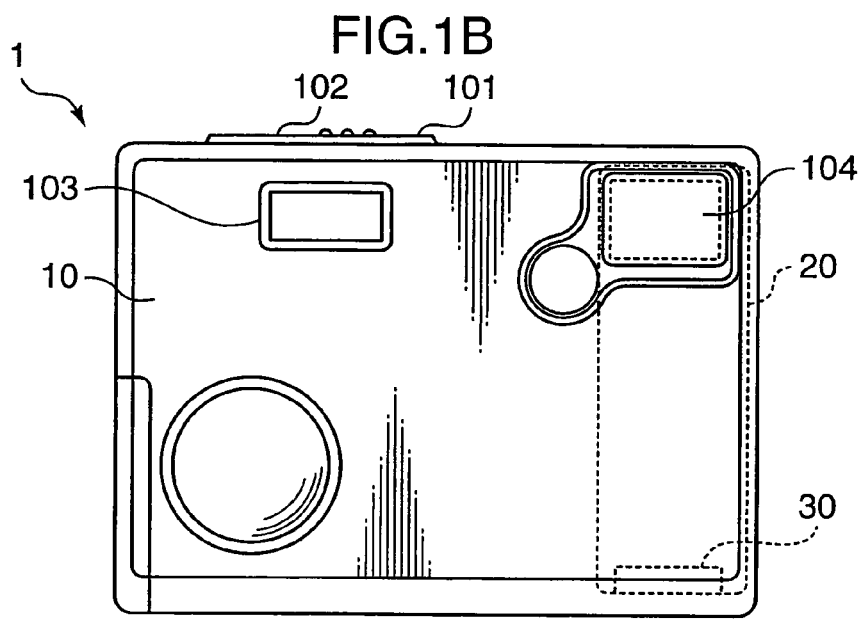
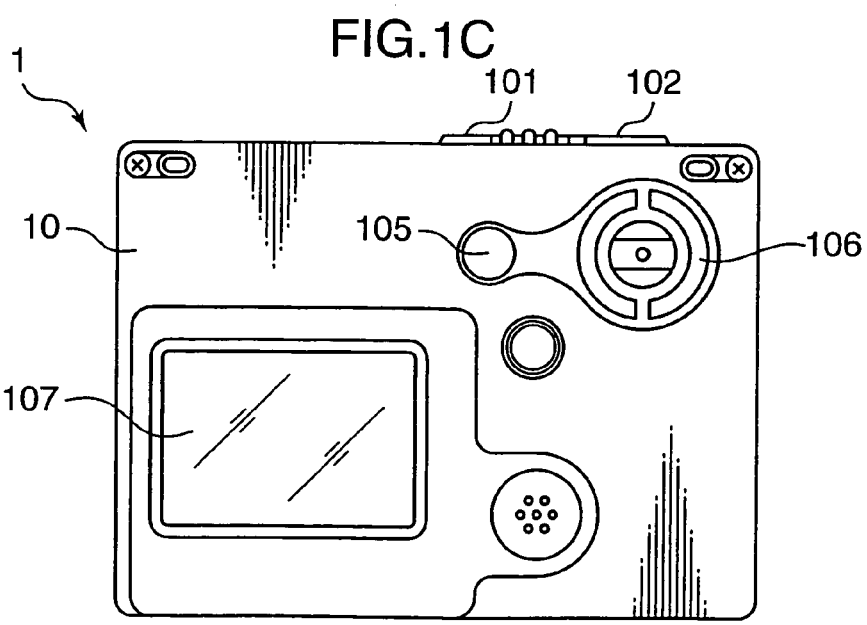

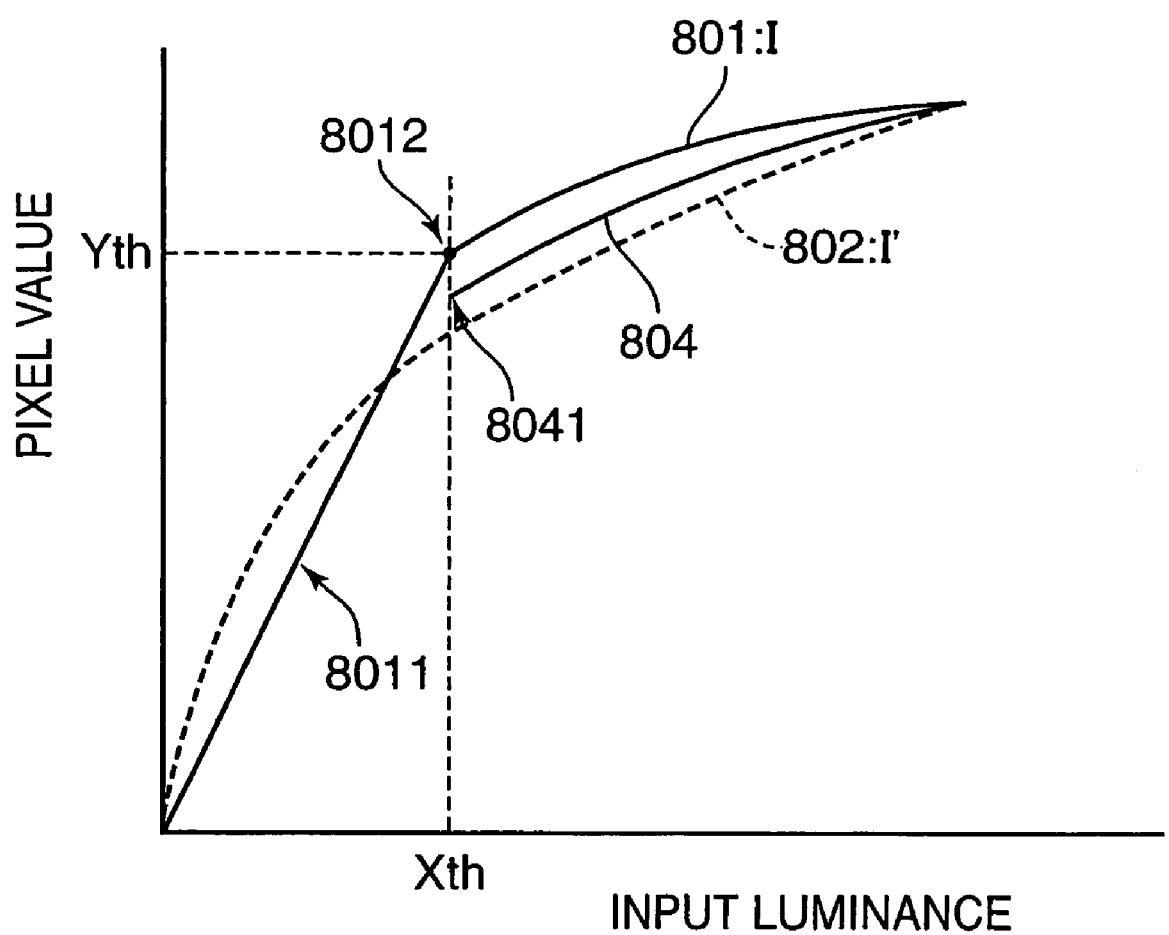

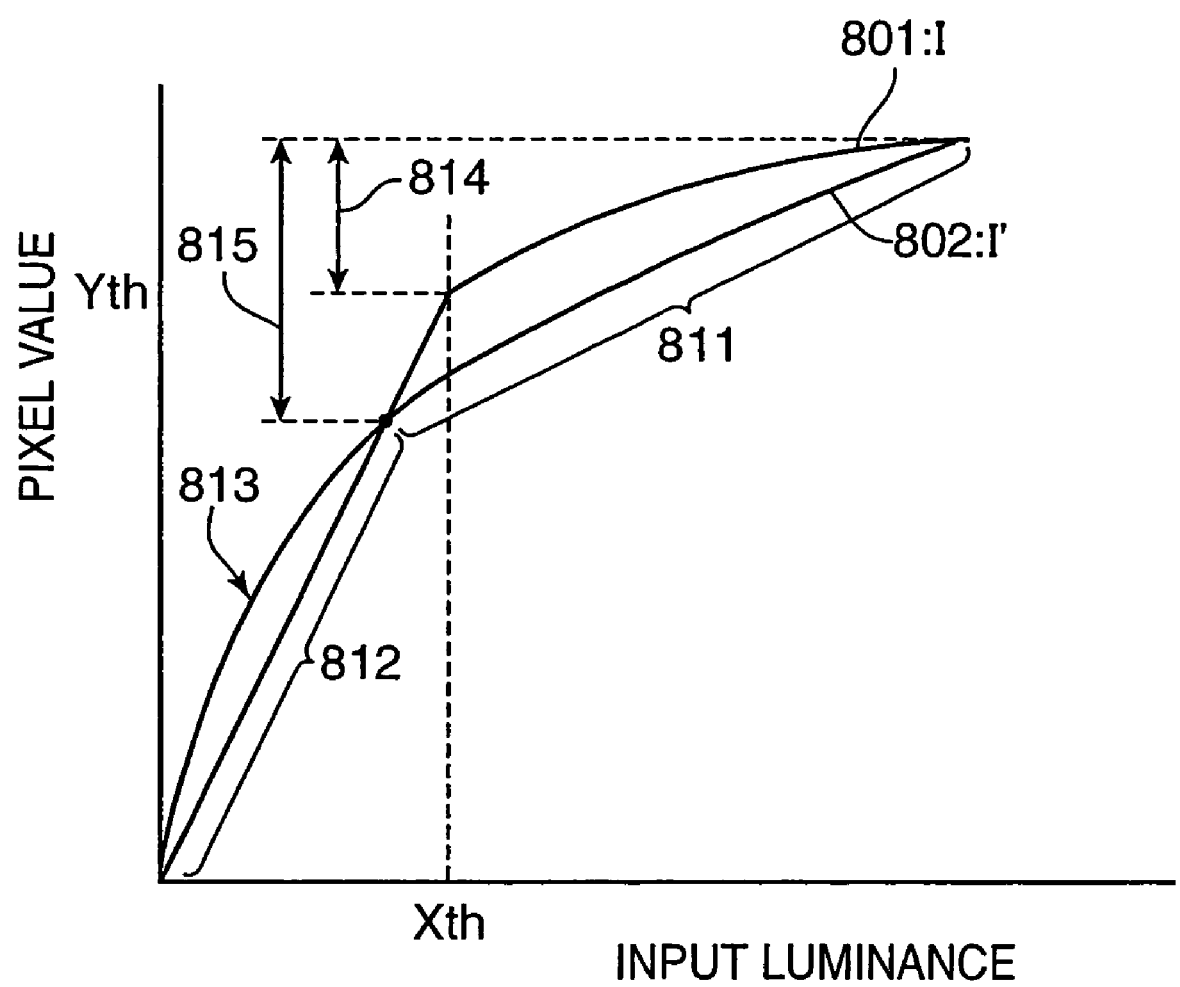

FIG.22

| | CONTROL FACTOR | SPECIFIC CONTROL MEANS |
|---|---|---|
| EXPOSURE CONTROL = AE CONTROL | PHOTOELECTRIC CONVERSION CHARACTERISTIC OF IMAGE SENSOR (DYNAMIC RANGE) | • CONTROL OF SWITCHING POINT (INFLEXION POINT) BETWEEN LINEAR CHARACTERISTIC REGION AND LOGARITHMIC CHARACTERISTIC REGION |
| | EXPOSURE VALUE (TOTAL QUANTITY OF LIGHT REACHING IMAGE SENSING SURFACE IN A VALID STATE OF PHOTOELECTRIC CONVERSION CHARACTERISTIC) | • ADJUSTMENT OF OPENING AREA OF APERTURE DIAPHRAGM<br>• ADJUSTMENT OF INTEGRAL TIME (SHUTTER SPEED ETC.) |

IMAGE SENSING APPARATUS AND IMAGE PROCESSING METHOD FOR USE THEREIN

This application is based on patent application No. 2004-377875 filed in Japan, the contents of which are hereby incorporated by references.

BACKGROUND OF THE INVENTION

1. Field of the Invention

The present invention relates to an image sensing apparatus equipped with an image sensor having a photoelectric conversion characteristic comprising a plurality of different characteristic regions, such as a photoelectric conversion characteristic which comprises a linear characteristic region where an electric signal is output therefrom while being transformed linearly relative to an incident light quantity and a logarithmic characteristic region where an electric signal is output therefrom while being transformed logarithmically relative to the incident light quantity, more specifically, a photoelectric conversion characteristic where a rate of change relative to the incident light quantity in a high luminance region is less than that in a low luminance region. In particular, the present invention relates to an image processing method for use in processing an image picked up by the image sensor, and an image sensing apparatus employing the image processing method.

2. Description of the Related Art

Late years, in order to cope with the demand for higher image quality, the expansion in a luminance range (brightness range) of a subject, or a dynamic range, which is treatable or processable by an image sensor, has become one of major themes in image sensing apparatuses, such as digital cameras. In connection with the expansion of a dynamic range, there has been known an image sensor designed to add a logarithmic transformation circuit having a MOSFET etc., to a solid-state image sensing device having a plurality of photoelectric conversion elements, such as photodiodes, disposed in a matrix arrangement, so as to allow the solid-state image sensing device to have an output characteristic which comprises one region where an electric signal is output therefrom while being transformed linearly relative to an incident light quantity and the other region where an electric signal is output therefrom while being transformed logarithmically relative to the incident light quantity, by taking advantage of a sub-threshold characteristic of the MOSFET (This image sensor is known and described as "LN/LOG sensor". An image having linear and logarithmic characteristic regions obtained by the LN/LOG sensor will hereinafter be referred to as "linear/logarithmic image"). As mentioned above, this LN/LOG sensor can provide an output transformed natural-logarithmically relative to an incident light quantity. Thus, as compared with an image sensor having a photoelectric conversion characteristic consisting only of a linear characteristic region, the LN/LOG sensor makes it possible to ensure a wider dynamic range. While this capability of ensuring a wider dynamic range is advantageous, an image signal is logarithmically compressed to cause a problem about deterioration in contrast (tone or gradation), particularly, in a logarithmic characteristic region.

Techniques, such as the LN/LOG sensor, for providing a wider dynamic range in an image sensing system are being developed. In contrast to the image sensing system, the development for providing a wider dynamic range in a display system (e.g. display or monitor) has less progressed so far. Thus, even if a dynamic range is expanded in an image to be input to the display system, this advantage is likely to be unable to be reflected in display. Further, an image having a wider dynamic range (wider dynamic range image) allows a larger volume of information than ever before to be contained therein. In this case, if such an image is handled (transmitted or stored) in a conventional manner, an image sensing apparatus will inevitably suffer from increase in cost. In order to effectively utilize the image data including a larger volume of information, or to allow an image obtained from an image sensing system using advanced techniques of expanding a dynamic range to be displayed with high image quality by use of a display system using less advanced techniques of expanding a dynamic range, it is requited to compress the entire dynamic range while maintaining valuable information contained in a wider dynamic range image.

In the above background, for example, the following Non-Patent Publication 1 discloses a dynamic range compression (hereinafter referred to as "DR compression") technique (multi-scale Retinex) based on the Retinex theory with a focus on human ocular characteristics (color constancy to luminance or brightness, which is intended to extract from an input image a component arising from an intensity of illumination light (this component will hereinafter be referred to as "illumination component"), and compress the illumination component so as to compress the entire dynamic range while maintaining a local contrast.

As to the color constancy, while light reflected from any of various objects is logically derived as a product of a reflectance of an object surface and illumination light illuminating the object surface, an actually perceived color and brightness of the object is largely dependent on the surface reflectance rather than characteristic of light projected on the retina. That is, the human ocular system has a mechanism of subtracting or eliminating an influence of the illumination light from the image on the retina. For example, respective spectral changes of an object under natural sunlight and under incandescent bulb light are perceived as a change in the illumination light but not as a change in color of the object itself. Based on this concept of color constancy, the Retinex theory is intended to extract an illumination component from an input image, and attenuate the extracted illumination component while maximally maintain a component arising from a surface reflectance to be noticed by the ocular system (this component will hereinafter be referred to as "reflectance component"), so as to reproduce a high-contract image. [Non-Patent Publication 1: "Image Dynamic Range Compression Techniques", IMAGE LAB (June 2004) pp 24 to 28.

If the DR compression technique as disclosed in the Non-Patent Publication 1 is applied to a linear/logarithmic image, and a wide dynamic range image obtained by a LN/LOG sensor is subjected to DR compression for providing improved (enhanced) contrast therein. This has a potential for allowing the linear/logarithmic image to have improved image quality (higher image quality) in a display system. However, the DR compression technique is designed for an image obtained through photoelectric conversion in a linear characteristic (linear characteristic image), and any compression technique for a linear/logarithmic image is not disclosed in the Non-Patent Publication 1.

When the DR compression technique is applied to a linear/logarithmic image, it is necessary to take into account, for example, the following points (1) and (2).

(1): If the DR compression technique is applied to a linear/logarithmic image without modifications, the linear/logarithmic image is simply compressed over all in such a manner that a photoelectric conversion characteristic 901 is transformed into a photoelectric conversion characteristic 902, as shown, for example, in FIG. 23. Thus, even though contrast in a logarithmic characteristic region is slightly improved (contrast in a linear characteristic region is further highlighted), each contrast in the logarithmic and linear characteristic regions has almost no change in terms of the entire photoelectric conversion characteristic (as compared with a photoelectric conversion characteristic 903 transformed without using the DR compression), and a desired contrast improvement is not achieved.

(2): As shown in FIG. 24A, when a logarithmic characteristic (image) in a linear/logarithmic image is transformed into a linear characteristic and the image is subjected to DR compression, an integer operation is performed during the transformation into the linear characteristic (a fractional part of a number is truncated, for example, "0.2" of "40.2" is truncated to be "40"), and consequently contrast in the linear characteristic 911 after the transformation will be lost. Moreover, as shown in FIG. 24B, if a logarithmic characteristic is transformed into linear characteristic while avoiding the above deterioration in contrast of the transformed linear characteristic, it is required to increase a bit width in an image processing section, as compared with a processing for the linear/logarithmic image illustrated in 24A. This leads to increase in device cost.

SUMMARY OF THE INVENTION

It is an object of the present invention to provide an image sensing apparatus and an image processing method which are free from the problems residing in the prior art.

It is another object of the present invention to provide an image sensing apparatus and an image processing method which can improve contrast in a picked-up image, particularly contrast in a high luminance region of a picked-up image, and achieve high-quality display onto a display system or the like of the picked-up image.

According to an aspect of the invention, an image sensing apparatus and an image processing method are adapted for subjecting a given image to a dynamic range compression processing. The image sensing apparatus is provided with an image sensor which has a photoelectric conversion characteristic comprising a first region where an electric signal is output therefrom while being changed relative to an incident light at a first rate, and a second region where an electric signal is output therefrom while being changed relative to the incident light at a second rate which is less than the first rate. An illumination component illuminating a surface of an object and a reflectance component of the object surface corresponding to the illumination component are extracted from an original image consisting of an image picked up by the image sensor. The illumination component is subjected to the dynamic compression processing. A new image corresponding to the original image is produced, based on the illumination component subjected to the dynamic compression processing by the compressor, and a reflectance component determined by a reflectance-component determiner based on the original image and the illumination component. The dynamic compression processing is applied to at least an illumination component in the second region of the original image.

These and other objects, features, aspects, and advantages of the present invention will become more apparent from the following detailed description of the preferred embodiments/examples with reference to the accompanying drawings.

BRIEF DESCRIPTION OF THE DRAWINGS

FIGS. 1A to 1C illustrate the appearance of a small-size digital camera which is suitable as one application of an image sensing apparatus according to a first embodiment of the present invention, wherein FIGS. 1A, 1B and 1C are, respectively, a top view, a front view and a back view of the digital camera.

FIG. 18 is an explanatory graph of production of a synthetic image O based on an image I1' and an original image I.

FIG. 20 is an explanatory graph of production of a synthetic image O based on an image I1' and an original image I.

FIG. 22 is an explanatory table of definitions of terms related to an exposure control.

DESCRIPTION OF THE PREFERRED EMBODIMENTS

Figure 2:
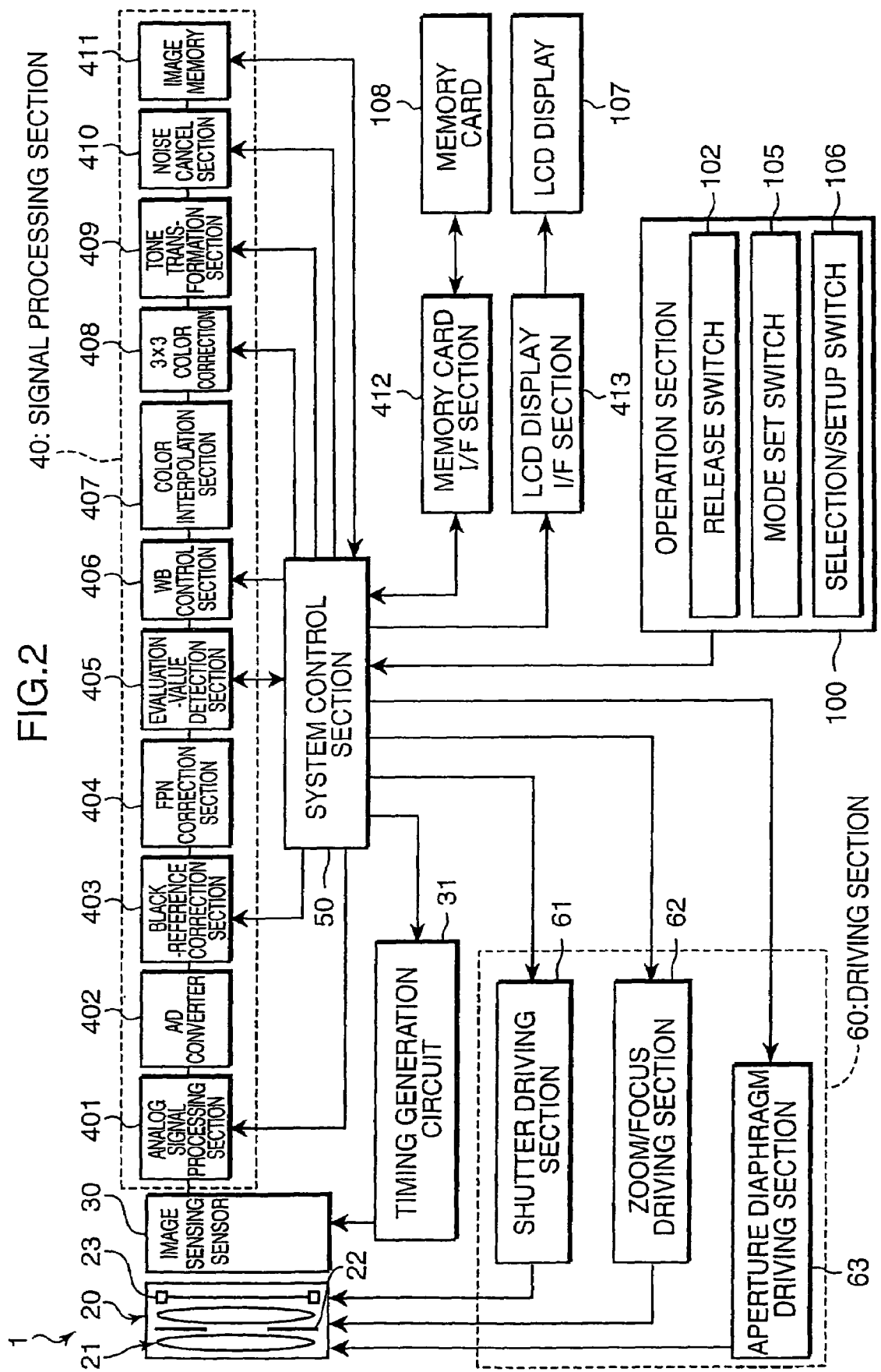
FIG. 2 is a block diagram showing an image processing system in the digital camera.

With reference to the drawings, an embodiment of the present invention will now be described.

First Embodiment

FIGS. 1A to 1C illustrate the appearance of a small-size digital camera 1 which is suitable as one application of an image sensing apparatus according to a first embodiment of the present invention, wherein FIGS. 1A, 1B and 1C are, respectively, a top view, a front view and a back view of the digital camera. This digital camera 1 comprises a camera main body 10 provided with various manual operation buttons, such as: a power switch 101 and a release switch 102 arranged in a top surface thereof; a flash generation section 103 and an image sensing lens window 104 arranged in a front surface thereof; and a mode set switch 105 and a selection/setup switch 106 arranged in a back surface thereof, and a LCD display 107 composed of a liquid-crystal monitor (LCD). The main body 10 has an inner space housing various main devices and a bent-type lens barrel 20.

The power switch 101 is a push-down type switch operable to turn on/off a power source of the camera 1. A user can repeatedly push down the power switch 101 to turn on/off the camera power source alternately. The mode set switch 105 is provided as a means to selectively set either one of a still-image shooting mode for taking a still image, and a moving-image shooting mode for taking a moving image.

The release switch 102 is a push-down type switch designed to have a "half-pushed position" where it is pushed down at an intermediate position of a full stroke, and a "fully-pushed position" where it is pushed down up to the full-stroke position. For example, in the still-image shooting mode, when the release switch 102 is pushed down to the half-pushed position, a preparatory operation for taking a still image of a subject (preparatory operation for automatic exposure control and/or automatic focusing control) is executed. When the release switch 102 is pushed down to the fully-pushed position, a shooting operation (a series of after-mentioned-operations for exposing an image sensor to light, subjecting an image signal obtained by the exposure to a given image processing, and recording the processed image on a memory card or the like) is executed. Further, in the moving-image shooting mode, when the release switch 102 is pushed down to the fully-pushed position, a given moving-image shooting operation is executed. Then, when the release switch 102 is re-pushed down to the fully-pushed position, the moving-image shooting operation is terminated.

The term "exposure control" has been used in the above description. The definition of the concept of "exposure control" as used in the present invention (hereinafter referred to as "AE control") will be described below with reference to FIG. 22. Differently from so-called "silver salt camera", a control technique for AE control in an image sensing apparatus for a digital camera, a digital camcorder or the like includes one technique of performing the control in association with a photoelectric conversion characteristic of an image sensor (by nonrandomly changing or transforming the photoelectric conversion characteristic), and another technique of adjusting a total quantity of light reaching an image sensing surface of an image sensor and an integral time of a photoelectrically converted current after photoelectric conversion. In this specification, the former will be referred to as "dynamic range control", and the latter will be referred to as "exposure value control". For example, the "dynamic range control" is performed by controlling a switching point (hereinafter referred to as "inflexion point") between a linear characteristic region and a logarithmic characteristic region of an image sensor. The "exposure value control" is performed by adjusting an opening area of an aperture or a shutter speed of a mechanical shutter, or controlling an integral time of electric charge based on control of an operation of resetting an image sensor.

The selection/setup switch 106 includes a manual operation button formed, for example, in a circular shape, and adapted to be manually pushed in four directions or upward, downward, rightward and leftward directions, and other four directions or upward/rightward, upward/leftward, upward/downward and upward/downward directions, in a detectable manner. The selection/setup switch 106 is designed to have a multi-function. For example, the selection/setup switch 106 serves as a manual operation switch for changing a selected item in a menu screen which is displayed on the LCD display to set a shooting scene, and specifically serves as a manual operation switch for changing a selected reproduction-target frame in an index screen displaying an array of thumbnail-size images. The selection/setup switch 106 further serves as a switch for performing a setting about a processing for a picked-up image (adjustment of image quality). Specifically, in this embodiment, the selection/setup switch 106 serves as a switch for setting and changing a segmentation parameter θ related to an image segmentation/extraction processing in an after-mentioned tone transformation section 409. Furthermore, the selection/setup switch 106 can serve as a zoom switch for changing a focal distance of an after-mentioned zoom lens.

The flash generation section 103 is designed to emit light to illuminate a subject when a subject image is dark, for example, in a state after the release switch 102 is pushed down to the half-pushed position (still-image shooting mode). The image sensing lens window 104 is an opening for introducing an optical image of a subject into the bent-type lens barrel 20 disposed in the inner space of the main body 10. The LCD display 107 is operable to display a recorded image on a built-in recording medium, after reproduction, and to display a continuously-taken through image (live view) of a subject in a waiting state or in the moving-image shooting mode.

The bent-type lens barrel 20 makes up an image sensing lens system for introducing a subject image through the image sensing lens window 104 and leading the subject image to an image sensor 30 disposed in the inner space of the main body 10. This lens barrel 20 has a length which is not changed even during a zooming or focusing operation. That is, the lens barrel 20 never protrudes outside from the main body 10. The lens barrel 20 has an inner space housing a group of lenses 21 (see FIG. 2) making up an image sensing optical system including a zoom lens block and a stationary lens block which are disposed in series to a light axis, and an aperture 22 disposed at an appropriate position of the lens group 21. Further, a shutter 23 is disposed at an appropriate position of the lens group 21, and adapted to be selectively opened and closed to open and shut a light path of the image sensing optical system. That is, an exposure value of the image sensor 30 is controlled by adjusting a setup opening area of the aperture 22, and open/close movements of the shutter 23.

(General Description on Electrical Configuration of Image Sensing Apparatus)

FIG. 2 is a block diagram showing an image processing system in the digital camera 1. The digital camera 1 comprises a operation section 100, the lens barrel 20, the image sensor 30, a signal processing section 40, a system control section 50 and a driving section 60. The operation section 100 includes the release switch 102, the mode set switch 105 and the selection/setup switch 106.

The image sensor 30 is operable to photoelectrically convert a light image of a subject focused through the lens group 21 in the lens barrel 20, into an image signal having three components R(red), G (green) and B (blue), depending on an light quantity of the light image, and output the image signal to the signal processing section 40. In the first embodiment, a logarithmic transformation-type solid-state image sensor designed to allow an output pixel signal (output electric signal generated through photoelectric conversion) to be output therefrom after being transformed logarithmically, instead of linearly, relative to an incident light quantity is used as the image sensor 30. The image sensor 30 has a characteristic in which, when an incident light quantity is low, the output pixel signal is output therefrom after being linearly transformed. That is, the image sensor 30 has a region where a photoelectric conversion characteristic is linear (linear characteristic region=in a dark condition), and a region where a photoelectric conversion characteristic is logarithmic (logarithmic characteristic region=in a bright condition). Further, the image sensor 30 is designed to allow a switching point (inflexion point) between the linear characteristic region and the logarithmic characteristic region to be arbitrarily controlled by a specific control signal. The structure and operation of the image sensor 30 will be described in detail later.

A timing generation circuit (timing generator) 31 is provided as a means to control an image sensing operation (accumulation of charges based on exposure, and readout of the accumulated charges). The timing generation circuit 31 is operable, based on an image sensing control signal from the system control section 50, to generate a given timing pulse (a pixel driving signal, a horizontal synchronization signal, a vertical synchronization signal, a horizontal scanning circuit driving signal and a vertical scanning circuit driving signal) and output the timing signal to the image sensor 30. Specifically, in the moving-image shooting mode, a frame image is picked up every 1/30 (sec), and sent to the signal processing section 40, according to the timing signal. During exposure in the still-image shooting mode, charges are accumulated in conjunction with an exposure operation of the image sensor 30, and the accumulated charges are sent to the signal processing section 40, according to the timing signal. The timing generation circuit 31 is also operable to generate an A/D conversion clock to be used in an after-mentioned A/D converter 402.

The signal processing section 40 serves as means to subject an image signal received from the image sensor 30 to a given analog signal processing and a digital signal processing. The signal processing for the image signal is performed on a pixel signal-by-pixel signal basis. The signal processing section 40 includes an analog signal processing section 401, an A/D converter 402, a black-reference correction section 403, a FPN correction section 404, an evaluation-value detection section 405, a white balance (WB) control section 406, a color interpolation section 407, a 3×3 color correction 408, a tone transformation section 409, a noise cancel section 410 and an image memory 411.

The analog signal processing section 401 is operable to subject an image signal (a group of analog signals from respective pixels) received from the image sensor 30 to a given analog signal processing. The analog signal processing section 401 includes a CDS circuit (Correlative Double Sampling) for reducing reset noise included in an analog image signal, and an AGC (Automatic Gain Control) for collecting a level of an analog image signal. The AGC circuit also serves as an amplifier operable, when an adequate exposure cannot be obtained, to amplify an analog image signal at an adequate amplification factor in conformity to an input voltage range of an A/D converter 402 in a subsequent stage, so as to offset a shortage in level of a picked-up image.

The A/D converter 402 is operable to convert an analog image signal from the analog signal processing section 401 into a digital image signal (image data), for example, of 12 bits. Specifically, this A/D converter 402 is operable, in response to receiving an A/D conversion clock from the timing generation circuit 31, to convert the analog image signal into a digital image signal.

The black-reference correction section 403 is operable to correct a reference value of a block level (image signal level in a totally-dark condition) of a digital signal from the A/D converter 402. This black-reference correction processing is performed based on image-sensing dynamic range information corresponding to the photoelectric conversion characteristic of the image sensor 30 to be received from the system control section 50. As mentioned above, the digital camera 1 according to the first embodiment is designed to controllably change the photoelectric conversion characteristic of the image sensor 30. Thus, an image signal level of the digital image signal from the A/D converter 402 in a totally-dark condition is varied according to a change in the photoelectric conversion characteristic of the image sensor 30. Under this condition, the black-reference correction section 403 can accurately correct the black reference correspondingly to such a change.

The FPN (Fixed Pattern Noise) correction section 404 is operable to remove an FPN of an image signal from the black-reference correction section 403. Generally, an output value of an image signal generated from the pixels of the image sensor 30 has variation due to variation in a threshold value of an FET incorporated in each circuit of the pixels. The fixed pattern noise means a noise caused by such variations in the output value of the image signal.

The evaluation-value detection section 405 is operable to detect from an image signal actually picked up by the image sensor 30, an evaluation value, such as an automatic exposure (AE) evaluation value, an automatic focusing (AF) evaluation value, or a white balance (WB) evaluation value (hereinafter referred to as "WB evaluation value"), which is to be used as a basic value for performing the AE control, the AF control or the WB control, etc. For example, the AE control typically includes the steps:

(1) measuring a luminance level and luminance range of a subject or an image-sensing target;

(2) calculating an exposure control value necessary for an image sensor to generate an output in conformity to the measured luminance level and luminance range; and (3) specifically adjusting an exposure value etc., based on the calculation result, and then starting an actual image sensing operation.

In order to undertake a role of Step (1), the evaluation-value detection circuit 405 is operable to obtain a luminance level and luminance range of a subject, from an image signal which is actually picked up by the image sensor 30, and send the obtained luminance level and luminance to the system control section 50 as an AE evaluation value. The AE evaluation value will be used for an AE control operation in a subsequent step.

In the AF control, for example, a focusing lens (lens group 21) is drivingly moved in a direction of a light axis alternately with respect to an image sensing operation by the image sensor 30, and a position of the focusing lens providing maximum contrast in an image obtained from the image sensing is determined (so-called "climb detection technique"). The determined position is sent to the system control section 50 as an AF evaluation value, and used for an AE control operation in a subsequent step. The white balance control is intended to correct a color of an output image to a suitable color for that of a light source of an output image. In this case, the evaluation-value detection section 405 is operable to calculate a luminance ratio and luminance difference between respective colors of R, G and B, based on an image signal from the FPN correction section 404 in the preceding stage, and send the calculated values to the system control section 50 as a WB evaluation value.

In order to obtain each evaluation value, such as AE evaluation value, the evaluation-value detection section 405 has a divisional photometry function of performing photometric measurement for a subject using a divisional photometry technique, and a histogram calculation function of calculating a histogram based on information about luminance of the subject obtained by the measurement, and performing "cutback of deduction" for a given luminance data, and determining an average luminance, maximum/minimum luminances or a luminance range. In the divisional photometry, an image sensing region (photometric region) is roughly classified, for example, into a central zone (main subject zone) and a peripheral zone surrounding the central zone (peripheral subject zone). Then, each of the main and peripheral subject zones is segmented into a given number of detection blocks, and luminance information of each of the detection blocks corresponding to the respective pixels is detected from picked-up image data. The evaluation-value detection section 405 further has other functions, such as a saturation determination function of determining whether an output of the image sensor 30 is saturated during detection of an AE (AF, WB) evaluation value.

The white balance control section 406 is provided as a means to change and correct each level of pixel data of three color components R, G, B in such a manner as to allow an image signal to have a given color balance, based on dynamic range information and a WB evaluation value from the system control section 50.

The color interpolation section 407 is provided as a means to interpolate data at the pixel deficient in frame image, with respect to each of three color components R, G, B in an image signal from the white balance control section 406. Specifically, the logarithmic transformation-type image sensing section 30 used in the first embodiment employs as its color filter a so-called Bayer type having a structure with a lattice or check arrangement for G and a line-sequential arrangement for R and B, and therefore color information is insufficient. Thus, the color interpolation section 407 is operable to interpolate pixel data at a position where no pixel exists, with data of a plurality of existing pixels.

The 3×3 color correction section 408 is provided as a means to correct chromaticness (correct hue) of an image signal having three color components R, G, B from the color interpolation section 407. The 3×3 color correction section 408 has three kinds of transformation coefficients for changing or transforming a level ratio of an image signal with three color components R, G, B, to change the level ratio using the transformation coefficients depending on shooting scenes so as to correct chromaticness (correct hue) of image data.

The tone transformation section 409 is provided as a means to transform a level of an image signal of three color components R, G, B from the 3×3 color correction section 408, using a given transformation characteristic (e.g. image transformation table) on a color component-by-color component basis, in such a manner as to be output at an adequate level, and to perform offset adjustment. That is, as a fundamental operation, the tone transformation section 409 operates to correct a tone characteristic of an image signal subjected to the white balance adjustment and color correction, to a tone characteristic of a display system, such as the LCD display 107 or a monitor TV as an external output device. The tone transformation section 409 is operable to change the tone characteristic of the image signal, based on dynamic range information (after-mentioned inflexion point information) from the system control section 50, an AE valuation value detected by the evaluation value detection section 405, etc.

Further, the tone transformation section 409 has a function of performing a DR compression processing during the correction to a tone characteristic of a display system, to provide improved contrast to a linear/logarithmic image obtained by the image sensor 30, particularly to a logarithmic characteristic region of the linear/logarithmic image. As to thus DR compression processing, the tone transformation section 409 is operable to segment an received image into one zone including a logarithmic characteristic region and the other zone including no logarithmic characteristic region (linear characteristic region) [segmentation/extraction]. Then, the tone transformation section 409 is operable to subject an illumination component of image data including the logarithmic characteristic region to the DR compression processing (in an after-mentioned second embodiment, an illumination component of image data in linear characteristic region is also subjected to the DR compression), and then synthesize the segmented image data. This function of the tone transformation section 409 will be described in detail later.

The noise cancel section 410 is provided as a means to remove a noise component of an image signal received from the tone transformation section 409 and extract and enhance only an edge component of the image signal so as to correct the image signal to provide excellent image sharpness. The noise cancel section 410 is operable to change a coring coefficient (coefficient for removing only a noise component of an image signal and extracting and enhancing an edge component of the image signal), based on dynamic range information from the system control section 50, so as to perform an adequate correction.

The image memory 411 is composed of a memory, such as ROM and/or RAM, and provided as a means to temporarily store image data, for example, after completion of the signal processing in the signal processing section 40. The image memory 411 has a storage capacity of being able to store image data, for example, of one frame.

A memory card I/F section 412 is an interface for outputting memory-card recording image data produced by the signal processing section 40, so as to store the image data on a memory card 108. The memory card 108 is a memory for recording and storing image data, such as still image and/or moving image, and designed to be detachable relative to the digital camera 1 so as to allow the image data to be exchanged with external recording media. An LCD display I/F section 413 is an interface for converting LCD displaying image data produced by the signal processing section 40 into an desired format, such as NTSC format or PAL format, and output the converted image data to the LCD display 107.

The system control section 50 is comprised, for example, of a CPU (Central Processing Unit), and provided as a means to control a shooting operation of the digital camera 1 in a centralized manner. Specifically, the system control section 50 is operable, based on information (the aforementioned AE, AF and WB evaluation values and others) sent from each section of the signal processing section 40 and the operation mode etc., of the digital camera 1, to calculate operational information, such as parameters, necessary for each section of the signal processing section 40, and the calculated operational information so as to control an operation of each processing section. In connection with this control of the operation of each processing section, the system control section 50 operates to control the execution of the DR compression processing in the tone transformation section 409. Further, the system control section 50 operates to control an operation of the timing generation circuit 31, the zooming and focusing movements of the lens group 21, and an operation of the driving section 60 for drivingly moving the aperture 22 and the shutter 23, and an operation for outputting image signals.

Figure 3:
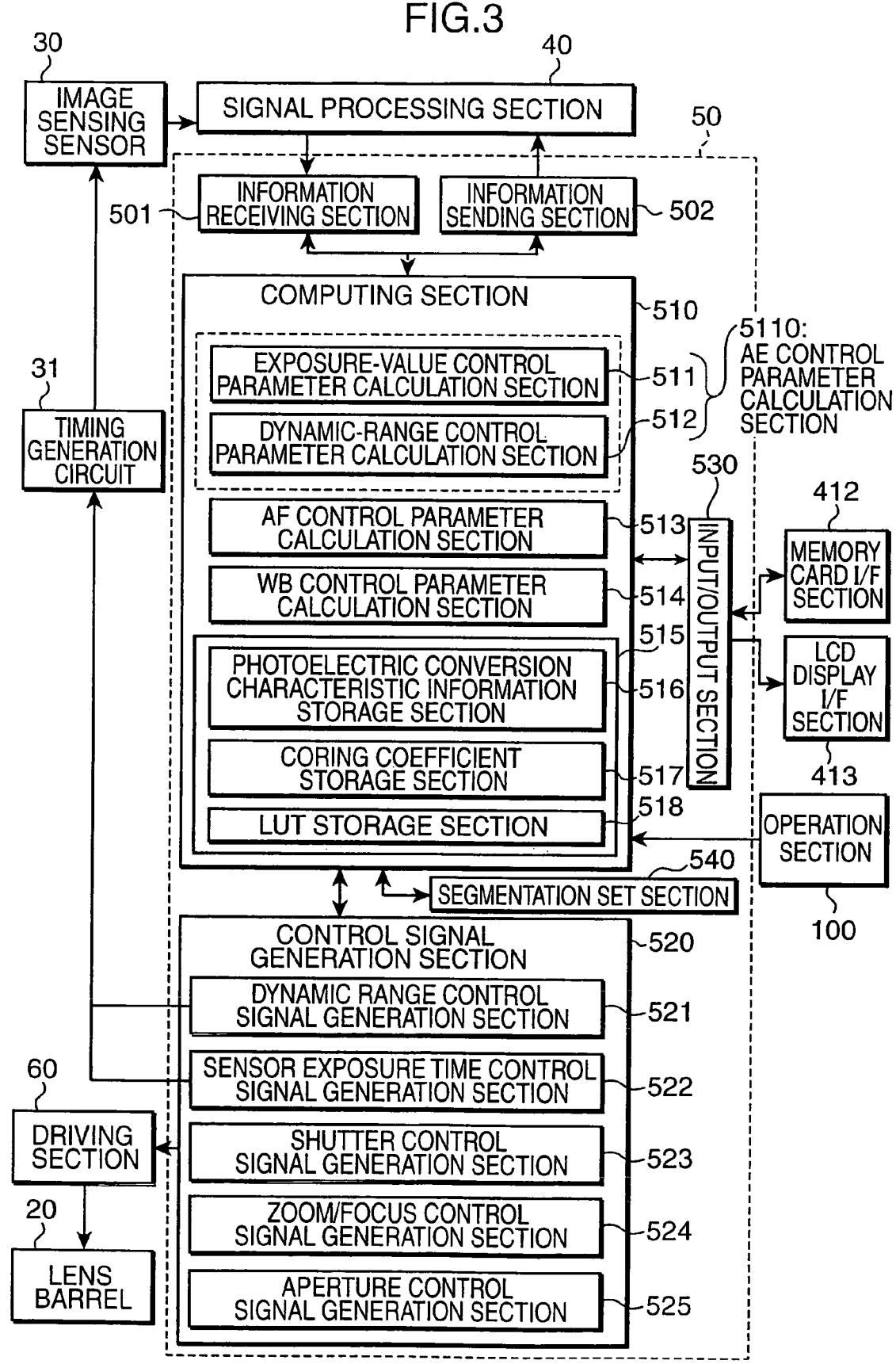
FIG. 3 is an explanatory block diagram of the function of a system control section incorporated in the digital camera.

FIG. 3 is an explanatory block diagram of the function of the system control section 50. The system control section 50 comprises: an information receiving section 501; an information sending section 502; a computing section 510 including a memory section 515; a control signal generation section 520; an input/output section 530; and a segmentation setting section 540.

The information receiving section 501 is operable to acquire the AE, AF and WB evaluation values detected by the evaluation detection section 405 of the signal processing section 40, and send these evaluation values to respective parameter calculation sections incorporated in the computing sections 510, in a sorted manner. The information sending section 502 is operable to timely read out information necessary for the signal processing section 40 (information about photoelectric conversion characteristic; coring coefficient; etc.) from the memory section 515, and timely send the read information to respective processing sections of the signal processing section 40 in a sorted manner.

The computing section 510 is provided as a means to calculating a control parameter based on the evaluation value sent from the information receiving section 501. The computing section 510 includes: an AE control parameter calculation section 5110 consisting of an exposure-value control parameter calculation section 511 and a dynamic-range control parameter calculation section 512; an AF control parameter calculation section 513; a white balance (WB) control parameter calculation section 514; and the memory section 515.

The memory section 515 is composed, for example, of ROM and/or RAM. The memory section 515 includes: a photoelectric conversion characteristic information storage section 516 which stores information about a photoelectric conversion characteristic of the image sensor 30 (information for obtaining a desired photoelectric conversion characteristic during shooting), i.e. an after-mentioned exposure-time setting value, aperture setting value or photoelectric conversion characteristic setting value (dynamic range information corresponding to the photoelectric conversion characteristic); a coring coefficient storage section 517 which stores a coring coefficient setting value for use in the noise cancel section 410; and a LUT storage section 518 which stores conversion information for performing data conversion (interconversion) for respective data obtained in a linear characteristic region and a logarithmic characteristic region of the image sensor 30, i.e. a LUT (Look Up Table) etc.

Figure 7:
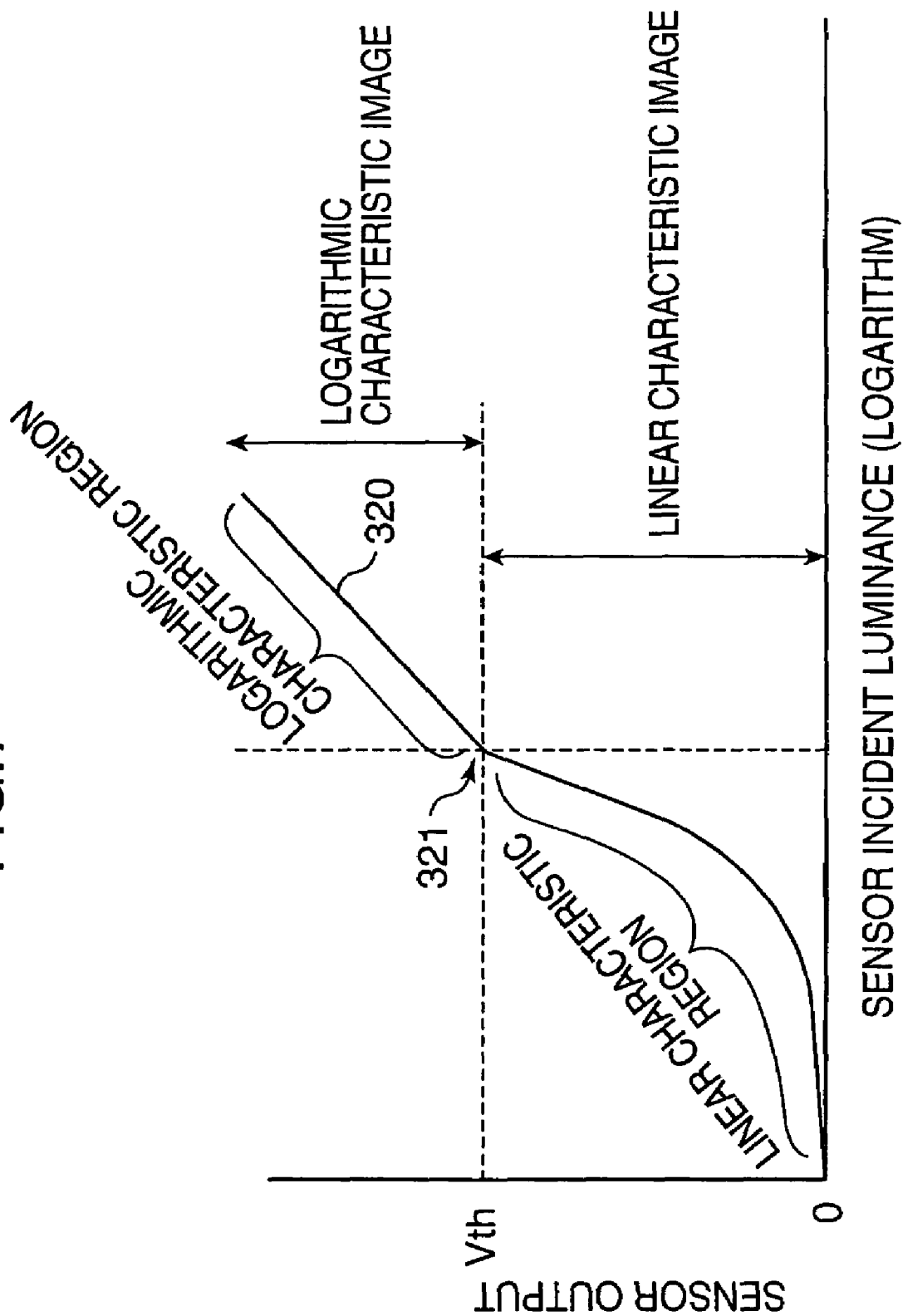
FIG. 7 is a graph showing one example of a photoelectric conversion characteristic of the image sensor.

The photoelectric conversion characteristic information storage section 516 may be designed to store a photoelectric conversion characteristic itself (after-mentioned photoelectric conversion characteristic curve as shown in FIG. 7). In addition to the above LUT, the LUT storage section 518 stores various other data, such as a LUT for use in performing data conversion between an exposure time/aperture opening area and an exposure time setting value/aperture setting value, and a LUT for use in performing data conversion between a value of photoelectric conversion characteristic inflexion point and a photoelectric conversion characteristic setting value. As mentioned above, data values stored in the photoelectric conversion characteristic information storage section 516, the coring coefficient storage section 517 and the LUT storage section 518 are timely sent from the information sending section 502 to the signal processing section 40.

The AE control parameter calculation section 5110 is operable to calculate a control parameter for setting an optimal exposure value during shooting and an optimal photoelectric conversion characteristic of the image sensor 30 so as to perform an exposure control (AE control) depending on a luminance of a subject. That is, in the AE control parameter calculation section 5110, the exposure-value control parameter calculation section 511 is provided as a means to calculate a control parameter for optimizing an exposure time and an aperture, and the exposure-value control parameter calculation section 511 is provided as a means to calculate an exposure time setting value and an aperture setting value depending on a subject luminance, based on photoelectric conversion characteristic information of the image sensor 30 at a time of acquisition of the AE evaluation value stored in the photoelectric conversion characteristic information storage section 516.

Further, the dynamic-range control parameter calculation section 512 is provided as a means to calculate a control parameter for optimizing a photoelectric conversion characteristic of the image sensor 30 depending on a subject luminance. The dynamic-range control parameter calculation section 512 is operable to calculate a photoelectric conversion characteristic, for example, in such a manner that a subject luminance for setting a dynamic range can provide a desired saturation output level in the image sensor 30. This calculation is also performed by referring to photoelectric conversion characteristic information of the image sensor 30 at a time of acquisition of the AE evaluation value stored in the photoelectric conversion characteristic information storage section 516.

The AF control parameter calculation section 513 is provided as a means to calculate a control parameter for setting an optimal focal distance during shooting of a subject, based on an AF evaluation value detected by the evaluation-value detection section 405. It is preferable that an AF evaluation value to be referred during calculation of this control value is acquired from each of a logarithmic characteristic region and a linear characteristic region of the image sensor 30, and a rough distance measurement (AF evaluation value obtained from the logarithmic characteristic region) control parameter and a detailed distance measurement (AF evaluation value obtained from the linear characteristic region) control parameter are calculated by utilizing respective features of the two characteristic regions.

The white balance control parameter calculation section 514 is provided as a means to calculate a control parameter for allowing an image signal to have a given color balance, based on a WB evaluation value detected by the evaluation value detection section 405. It is preferable that an AF evaluation value to be referred during calculation of this control value is acquired from each of a logarithmic characteristic region and a linear characteristic region of the image sensor 30, and two control parameters corresponding to the two characteristic regions are calculated.

The control signal generation section 520 is provided as a means to generate a control signal for activating and driving each control operation element in response to the various control parameters calculated by the computing section 510. The control signal generation section 520 includes a dynamic range control signal generation section 521, a sensor exposure time control signal generation section 522, a shutter control signal generation section 523, a zoom/focus control signal generation section 524 and an aperture control signal generation section 525.

The dynamic range control signal generation section 521 is operable to generating a driving signal for the image sensor 30 to adjust an output level point (inflexion point) where a photoelectric conversion characteristic is switched from the linear characteristic region to the logarithmic characteristic region, in accordance with a photoelectric conversion characteristic setting value for the image sensor 30 calculated by the dynamic-range control parameter calculation section 512, and send the generated driving signal to the timing generation circuit 31. In response to receiving this driving signal, the timing generation circuit 31 is operable to generate a timing signal for controlling a dynamic range of the image sensor 30 so as to drive the image sensor 30. Specifically, an inflexion point of a photoelectric conversion characteristic of the image sensor 30 is changed by controlling a signal φVPS for the image sensor 30 (a value of voltage VPH or time ΔT of φVPS). Thus, the dynamic range control signal generation section 521 is operable to control a driving signal for the timing generation circuit 31 to adjust the signal φVPS, so as to allow a dynamic range of the image sensor 30 to be optimized relative to a subject luminance.

The sensor exposure time control signal generation section 522 is provided as a means to generate a control signal for controlling an exposure time (integral time) of the image sensor 30 by means of an electronic circuit-based control instead of a mechanical control of an aperture 22 and/or shutter 23. The sensor exposure time control signal generation section 522 is operable to generate a driving signal for the image sensor 30 based on an optimal exposure value calculated by the exposure-value control parameter calculation section 511, in such a manner as to ensure a desired exposure time (specifically, this driving signal is a signal for controlling a time ΔS to allow the signal φVPS for the image sensor 30 to be set at an intermediate potential M, as described later), and send the driving signal to the timing generation circuit 31. In response to receiving this driving signal, the timing generation circuit 31 is operable to generate a timing signal for controlling an exposure time of the image sensor 30 so as to drive the image sensor 30.

In the same manner, the shutter control signal generation section 523 is operable, based on an optimal exposure value calculated by the exposure-value control parameter calculation section 511, to generate a control signal for setting a shutter speed (shutter open time) of the shutter 23 in conformity to the exposure time. The zoom/focus control signal generation section 524 is operable, based on an optimal focal distance calculated by the AF control parameter calculation section 513, to generate a control signal for driving the lens group 21. The aperture control signal generation section 525 is operable, based on an optimal exposure value calculated by the exposure-value control parameter calculation section 511, to generate a control signal for setting an opening area of the aperture 22. The control signals generated by the shutter control signal generation section 523, the zoom/focus control signal generation section 524 and the aperture control signal generation section 525 are sent to corresponding elements of the driving section 60.

The input/output section 530 is connected to the memory card I/F section 412 and the LCD display I/F section 413 to perform an input/output operation. For example, the input/output section 530 is operable, in response to an instruction signal from the manual control section 100, to subject a picked-up image to a given image processing, and then record the processed picked-up image signal on the memory card 108 or display it on the LCD display 107, or to reversely read out an image signal from the memory card 108.

The segmentation setting section 540 is provided as a means to set a segmentation position of a linear/logarithmic image in the DR compression processing according to the tone transformation section 409. Specifically, the segmentation setting section 540 is operable to set a position of the segmentation parameter θ at either one of a position of θ=Yth or any position satisfying the following relationship: θ<Yth. As to the position defined by θ<Yth, this positional range may be divided by a given number of positions stepwise on the basis of a predetermined lower limit, and a user may select one of the positions. Alternatively, a single position may be pre-set in the positional range of θ<Yth. In this case, it may be designed that, if θ=Yth is not selected, the pre-set position may be automatically selected. Further, a fixed value may be set at a given position θ≦Yth. In this case, it may be designed such that when a user designates a contract improvement mode using the operation section 100, the fixed position automatically set.

Returning to FIG. 2, the driving section 60 is provided as a means to actually drive a mechanical derived section incorporated in the digital camera 1, based on the control signal generated by the control signal generation section 520. The driving section 60 includes a shutter driving section 61, the zoom/focus driving section 62 and the aperture driving section 63. The shutter driving section 61 is operable, in response to receiving the control signal from the shutter control signal generation section 523, to openably/closable drive or move the shutter 23 in such a manner as to be opened for a given time-period. The zoom/focus driving section 62 is operable, in response to receiving the control signal from the zoom/focus control signal generation section 524, to activate a driving source, such as a motor, for moving the zoom lens block or focusing lens block of the lens group 21, so as to move the lens block to a focal position. The aperture driving section 63 is operable, in response to receiving the control signal from the aperture control signal generation section 525, to drive the aperture 22 so as to allow the aperture to have a given opening area.

Fundamental Characteristic of Image Sensor in First Embodiment

In the first embodiment, the image sensor 30 is fundamentally designed to have a photoelectric conversion characteristic which comprises a linear characteristic region where an electric signal is output therefrom while being transformed linearly relative to an incident light, and a logarithmic characteristic region where an electric signal is output therefrom while being transformed logarithmically relative to the incident light. Thus, the fundamental characteristic of the image sensor 30 will be described in detail in connection with one specific example thereof.

Figure 4:
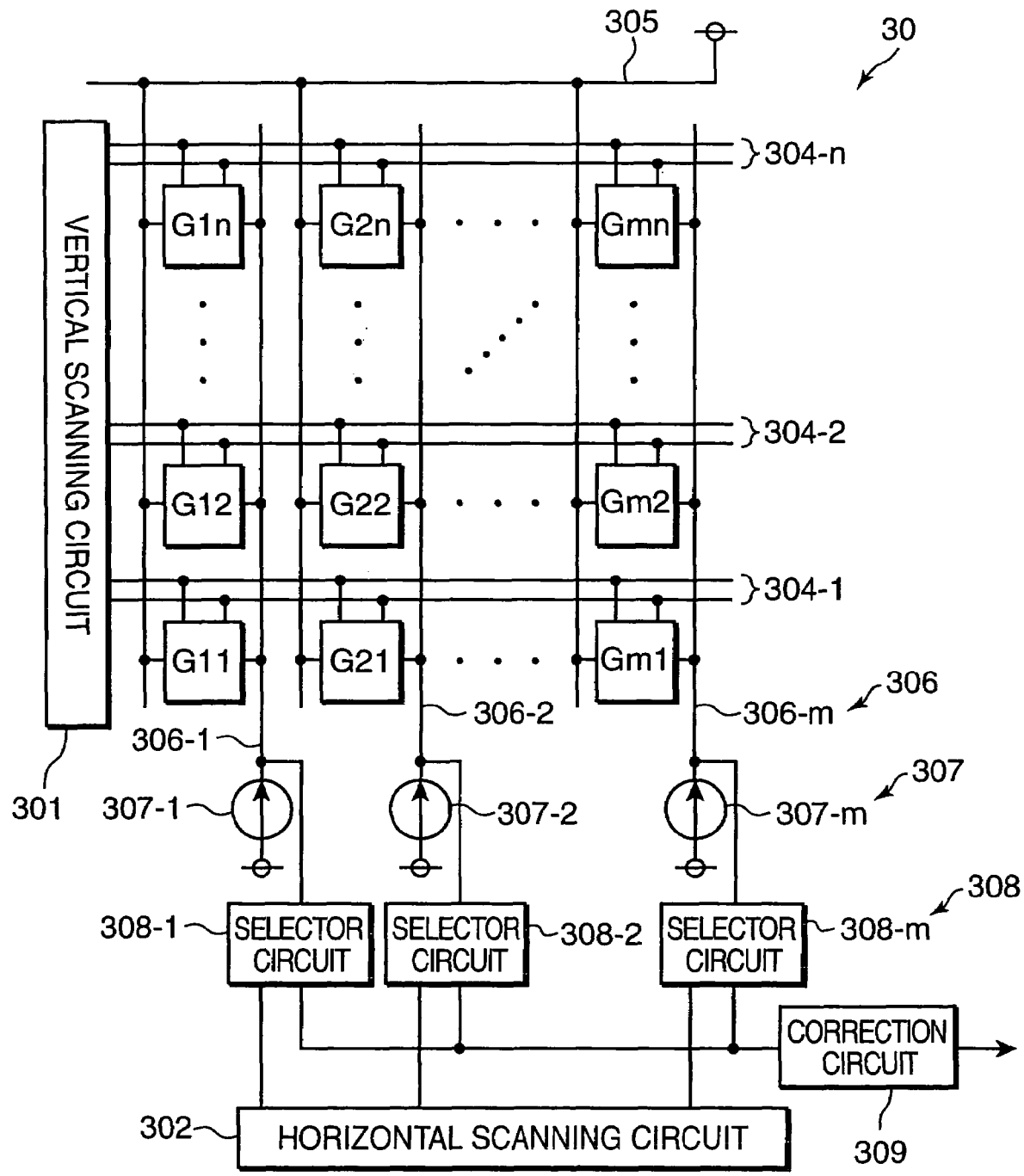
FIG. 4 is a schematic block diagram showing a 2-dimensional MOS solid-state image sensing device as one example of an image sensor.

FIG. 4 is a schematic block diagram showing a 2-dimensional MOS solid-state image sensing device as one example of the image sensor 30. In this figure, G11 to Gmn indicate a plurality of pixels disposed in a matrix arrangement. In the vicinity of an outer periphery of a pixel portion consisting of the pixels G11 to Gmn, a vertical scanning circuit 301 and a horizontal scanning circuit 302 is disposed. The vertical scanning circuit 301 sequentially scans a plurality of row lines (signal lines) 304-1, 304-2, - - - , 304-*n* (hereinafter referred to collectively as "row line 303"). The horizontal scanning circuit 302 sequentially reads photoelectrically converted signals led by a plurality of output signal lines 306-1, 306-2, - - -, 306-*n* (hereinafter referred to collectively as "output signal line 306"), in a horizontal direction on a pixel-by-pixel basis. Each of the pixels is supplied with power through a power line 305. While each of the pixels is connected to not only each of the above lines and output signal lines but also other lines, such other lines are omitted in FIG. 4.

The output signal lines 306-1, 306-2, - - -, 306-*n* are provided, respectively, with a plurality of constant current sources 307-1, 307-2, - - -, 307*m* (hereinafter referred to collectively as "constant current source 307") each of which is paired with an after-mentioned transistor T5 to make up an amplifier circuit. As to this amplifier circuit, a resistor or transistor (MOS transistor) may be used in place of the constant current source 307. Image data during image sensing by the pixels and correction data during reset are output through the output signal line 306, and then sequentially entered into a plurality of selector circuits (sample/hold circuits) 308-1, 308-2, - - -, 308-*m* (hereinafter referred to collectively as "selector circuit 308"). The image data and the correction data are entered into the selector circuits on a row-by-row basis, and sampled/held thereby. The sampled/held image data and correction data are output to a correction circuit 309 on a column-by column basis. In the correction circuit 309, the image data is corrected in accordance with correction data to remove therefrom a noise component caused by variation in sensitivity. Then, on a pixel-by-pixel basis, the correction circuit 309 serially outputs the corrected image data without noise due to variation in sensitivity of the pixels.

Figure 5:
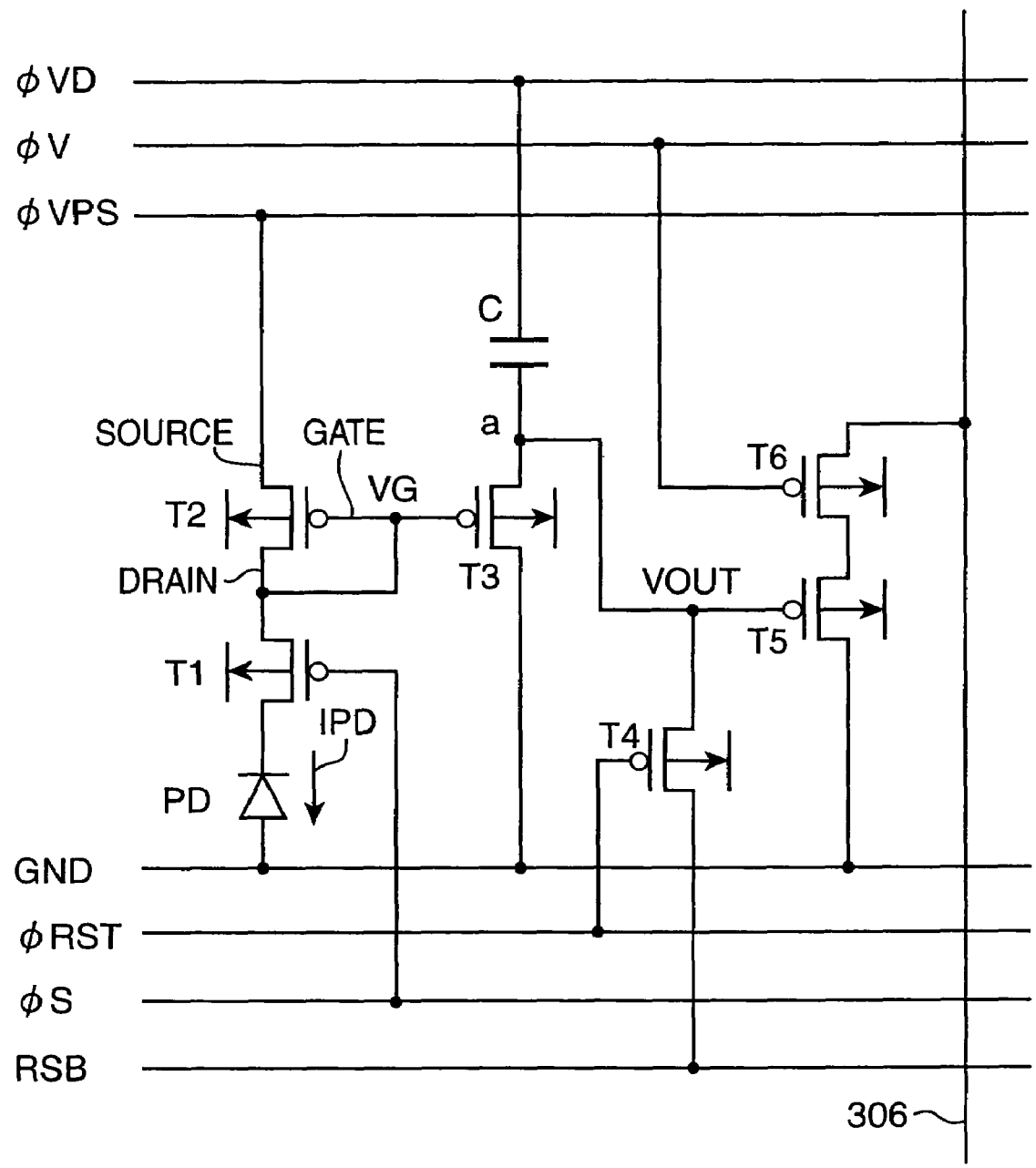
FIG. 5 is a circuit diagram showing one example of the configuration of each of a plurality of pixels G11 to Gmn illustrated in FIG. 4.

FIG. 5 is a circuit diagram showing one example of the configuration of each of the pixels G11 to Gmn illustrated in FIG. 4. As shown in this figure, the pixel comprises a photodiode PD, six transistors T1 to T6 as a MOSFET (Metal Oxide Semiconductor Field Effect Transistor), and a capacitor C serving as an integrator. In this example, a P-channel MOSFET is used as each of the transistors T1 to T6 (N-channel MOSFET may be used). φVD, φV, φVPS, φRST, φS and RSB indicate a signal to the transistors and the capacitor, and GND indicates grounding.

The photodiode PD serves as a photosensitive portion (photoelectric conversion portion) adapted to output an electric signal (photocurrent IPD) depending on an incident light quantity from a subject. The transistor T5 makes up a source-follower amplifier in cooperation with the constant current source 307 illustrated in FIG. 4, and amplifies a voltage VOUT (current amplification). The transistor T6 serves as a read transistor adapted to be switched in response to a certain voltage applied to the gate thereof. Specifically, the transistor T6 has a source connected to the output signal line 304 illustrated in FIG. 4, and, when turned on, leads a current amplified by transistor T5 to the output signal line 306.

The transistor T2 is adapted to generate a voltage transformed linearly or logarithmically relative to the photocurrent IPD at a gate thereof. In MOSFETs, when a gate voltage is equal to or less than a threshold, a minute current, so-called subthreshold current, flows. The transistor T2 exhibits the linear transformation or logarithmic transformation by means of this subthreshold characteristic.

Specifically, when a subject as an image sensing target has a low luminance (subject is in a dark condition) or when a quantity of light to be incident in the photodiode PD is low, the transistor T2 has a gate potential greater than a source potential thereof. Thus, the transistor T2 is in a so-called "cutoff state" in which no subthreshold current flows through the transistor T2 (the transistor T2 is not activated in the subthreshold region). In this state, a photocurrent generated in the photodiode PD flows in a parasitic capacitance of the photodiode PD, and a voltage is caused by accumulated charges proportionately thereto. Then, through the transistor T1 which is in its ON state at this moment, the voltage generated in proportion to charges accumulated in the parasitic capacitance is applied to respective gates of the transistors T2, T3, as indicated by the voltage VG. In response to this voltage VG, a current flows through the transistor T3, and a charge will be accumulated in the capacitor C in an amount proportional to the voltage VG (the transistor T3 and the capacitor C make up an integrator circuit). Then, a voltage linearly proportional to an integrated value of the photocurrent IPD appears at a connection node "a" between the transistor T3 and the capacitor C, or as an output VOUT. At this moment, the transistor T4 is in its OFF state. Then, when the transistor T6 is turned on, charges accumulated in the capacitor are led out to the output signal line 306 as an output current through the transistor T5. This output current corresponds to a value obtained by linearly transforming an integrated value of the photocurrent IPD. This is an operation of the image sensor 30 in a linear characteristic region.

When a subject as an image sensing target has a high luminance (subject is in a bright condition) or when a quantity of light to be incident in the photodiode PD is high, the transistor T2 has a gate potential equal to or less than a source potential thereof. Thus, a subthreshold current flows through the transistor T2 (the transistor T2 is activated in the subthreshold region), and a voltage VG having a value obtained by natural-logarithmically transforming the photocurrent IPD is generated at respective gates of the transistors T2, T3. In response to this voltage VG, a current flows through the transistor T3, and a charge equivalent to a value obtained by natural-logarithmically transforming the photocurrent IPD is accumulated in the capacitor C. Thus, a voltage proportional to a value obtained by natural-logarithmically transforming the photocurrent IPD is generated at the connection node "a" between the transistor T3 and the capacitor C. At this moment, the transistor T4 is in the OFF state. Then, when the transistor T6 is turned on, charges accumulated in the capacitor are led out to the output signal line 306 as an output current through the transistor T5. This output current corresponds to a value obtained by natural-logarithmically transforming an integrated value of the photocurrent IPD. This is an operation of the image sensor 30 in a logarithmic characteristic region. As above, each pixel generates a voltage linearly or logarithmically depending on an incident light amount (subject luminance).

The transistor T1 is a switch for use in taking out reset noise data (noise signal caused by production variation in the transistor T2). The transistor T1 is in its ON state except for during reset, and a photocurrent IPD flows between (drain of) the transistor T2 and the photodiode PD. The transistor T1 is turned off during reset, a photocurrent IPD of the photodiode PD is blocked, and only a component of the above variation is taken out. This variation component (noise signal) is subtracted from after-mentioned video signal. The transistor T4 serves as a means for resetting the capacitor C, and operates as a switch to be turned on/off in response to a voltage applied to a gate thereof. When the transistor T4 is turned on, a reset voltage (voltage of the aforementioned RSB) is applied to allow charges accumulated in the capacitor C to be returned to its original state or in a state before initiation of the integration.

Figure 6:
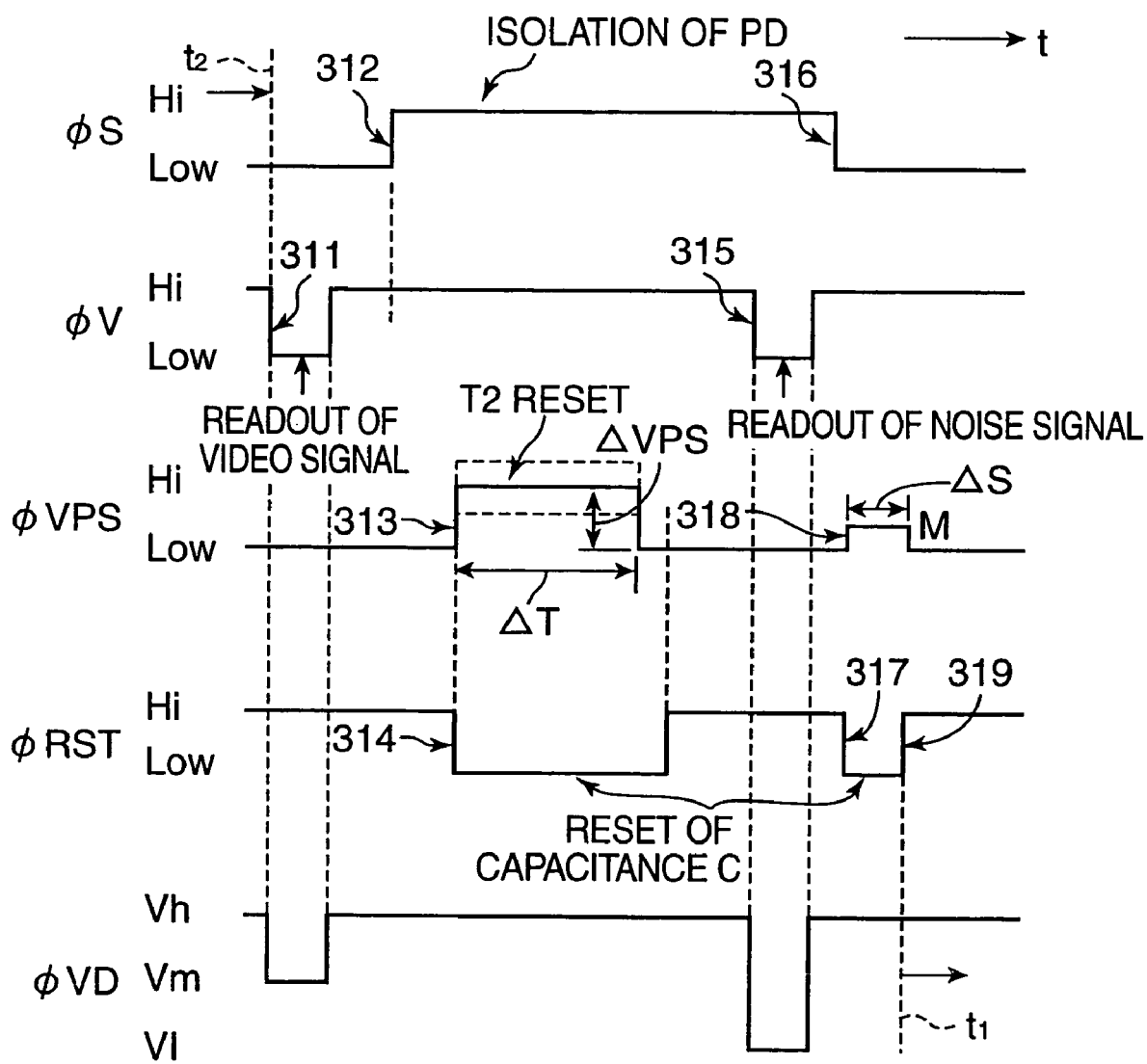
FIG. 6 is a timing chart showing one example of an image sensing operation in the image sensor.

FIG. 6 is a timing chart showing one example of an image sensing operation in the image sensor 30 (pixel).

Due to the polarity of the P-channel MOSFET, it is turned off at Hi (Hi-level) and turned on at Low (Low-level), as described below. First, the signal φV becomes Low at a time indicated by "311" to turn on the transistor T6, and therefore a video signal is read out. That is, charges accumulated in the capacitance C are led out to the output signal line 306 as an output current (video signal). Then, the signal φS becomes Hi at a time indicated by "312" to turn off the transistor T1, and therefore the photodiode PD is isolated. Then, the signal φVPS becomes Hi at a time indicated by "313" to reset the transistor T2. At the same time as the transistor T2 is reset, the signal φRST becomes Low at a time indicated by "314" to turn on the transistor T4, and therefore a reset voltage of the signal RSB is applied to the capacitor C (connection node "a") (a potential of the connection node "a" becomes equal to a potential (VRSB) of RSB), and therefore (charges of) the capacitor C is reset. After the transistor T2 and the capacitor C are reset in the above manner, the signal φV becomes Low again at a time indicated by "315" to turn on the transistor T6, and therefore a noise signal is led out to the output signal line 306.

Then, the signal φS becomes Low at a time indicated by "316" (to turn on the transistor T1), and therefore the isolation of the photodiode PD is released. Then, the signal φVPS becomes Intermediate-level or M at a time indicated by "318" to reset a parasitic capacitance of the photodiode PD so as to reduce a residual image. Further, in order to allow an initial voltage in integration for the next frame to be at a constant value, the signal φRST becomes Low again at a time indicated by "317" to turn on the transistor T4, and therefore the capacitor C is reset again.

Then, the signal φVPS changes from M to Low at a time indicated by "319", and the operation for resetting a parasitic capacitance of photodiode PD is completed. Further, the signal φRST changes from Low to Hi, and the operation for resetting the capacitor C is completed. At this timing or at Time t1, the integration in the capacitor C stars. This integration will be continued until a time indicated by "311" when the signal φV changes from Hi to low, i.e. Time t2 when an operation for reading out a video image is initiated in the next frame. A time period between Times t1 and t2 corresponds to an integration time of the capacitor C, i.e. an exposure time in a shooting operation. This exposure time is controlled by adjusting a time ΔS (time period or time length) during which the signal φVPS is supplied to provide M (Intermediate-level). The time ΔS is controlled by the sensor exposure time control signal generation section 522 through the timing generation circuit 31. The signal φVD is used as a means to control potential (level) in such a manner as to adequately maintain an operation range of the aforementioned amplifier (source follower amplifier) or adjust offset which would otherwise occur in a video signal and a noise signal. Vh, Vm and Vl of the signal φVD indicate, respectively, high potential, intermediate potential and low potential.

As described above, the image sensor 30 can obtain an output signal transformed linearly or logarithmically depending on a luminance of a subject, and has a photoelectric conversion characteristic 320 as shown in FIG. 7. As shown in this figure, the photoelectric conversion characteristic 320 is divided into a linear characteristic region and a logarithmic characteristic region, on the basis of or by an inflexion point 321. This inflexion point 321 is a transfer or transition point at which the linear characteristic region is changed into the logarithmic characteristic region, and an output of the image sensor 30 at the inflexion point 321 is indicated by Vth. Generally, in a linear characteristic region, while it is impossible to sense or pick up image of a subject in a wide luminance range (dynamic range is narrow), high tone quality can be obtained in the entire image (higher tone can be obtained), and even if a subject is in a dark condition (e.g. in cloudy weather or in a shaded area), a high-tone high-grade image can be obtained. In a logarithmic characteristic region, while tone equality becomes lower in high luminance, an image of a subject can be obtained in wide luminance range (dynamic range is wide), and, even if a subject is in a bright condition (e.g. in direct sunshine or with his/her back to direct sunshine), a spatial high-grade image can be obtained even in a dark region.

Figure 11:
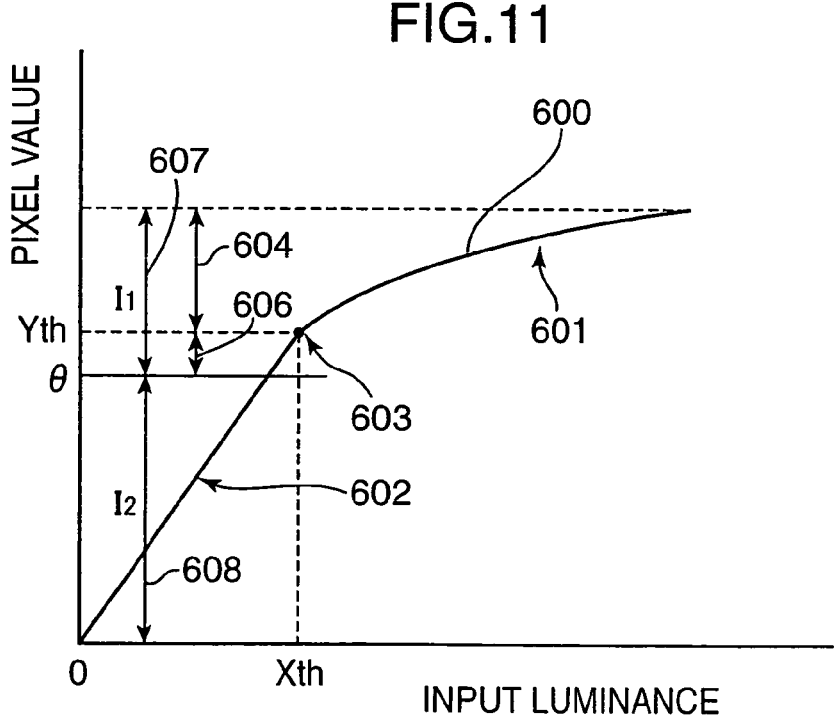
FIG. 11 is an explanatory graph of segmentation/extraction of images I1, I2 from an original image (photoelectric conversion characteristic), on the basis of a border defined by a segmentation parameter θ.

This photoelectric conversion characteristic 320 (inflexion point 321) can be changed (moved) by adjusting a difference in voltage between Hi and Low of the signal. φVPS. Specifically, given that a voltage in Hi state is VPH, and a voltage in Low state is VPL, a voltage difference ΔVPS (=VPH−VPL) (FIG. 9) can be adjusted to freely change the photoelectric conversion characteristic 320 (inflexion point 321) to a photoelectric conversion characteristic 322 (inflexion point 324) and a photoelectric conversion characteristic 323 (inflexion point 325) as shown in FIG. 11. When a photoelectric conversion characteristic is changed in this manner, a ratio between a linear characteristic region and a logarithmic characteristic region is changed, so that a photoelectric conversion characteristic having a linear characteristic region in a larger ratio as shown in the photoelectric conversion characteristic 322, or a photoelectric conversion characteristic having a logarithmic characteristic region in a larger ratio as shown in the photoelectric conversion characteristic 323, can be obtained. In this case, a photoelectric conversion characteristic may be changed in such a manner as to have either one of a linear characteristic region and a logarithmic characteristic region, in its entirety.

Figure 8:
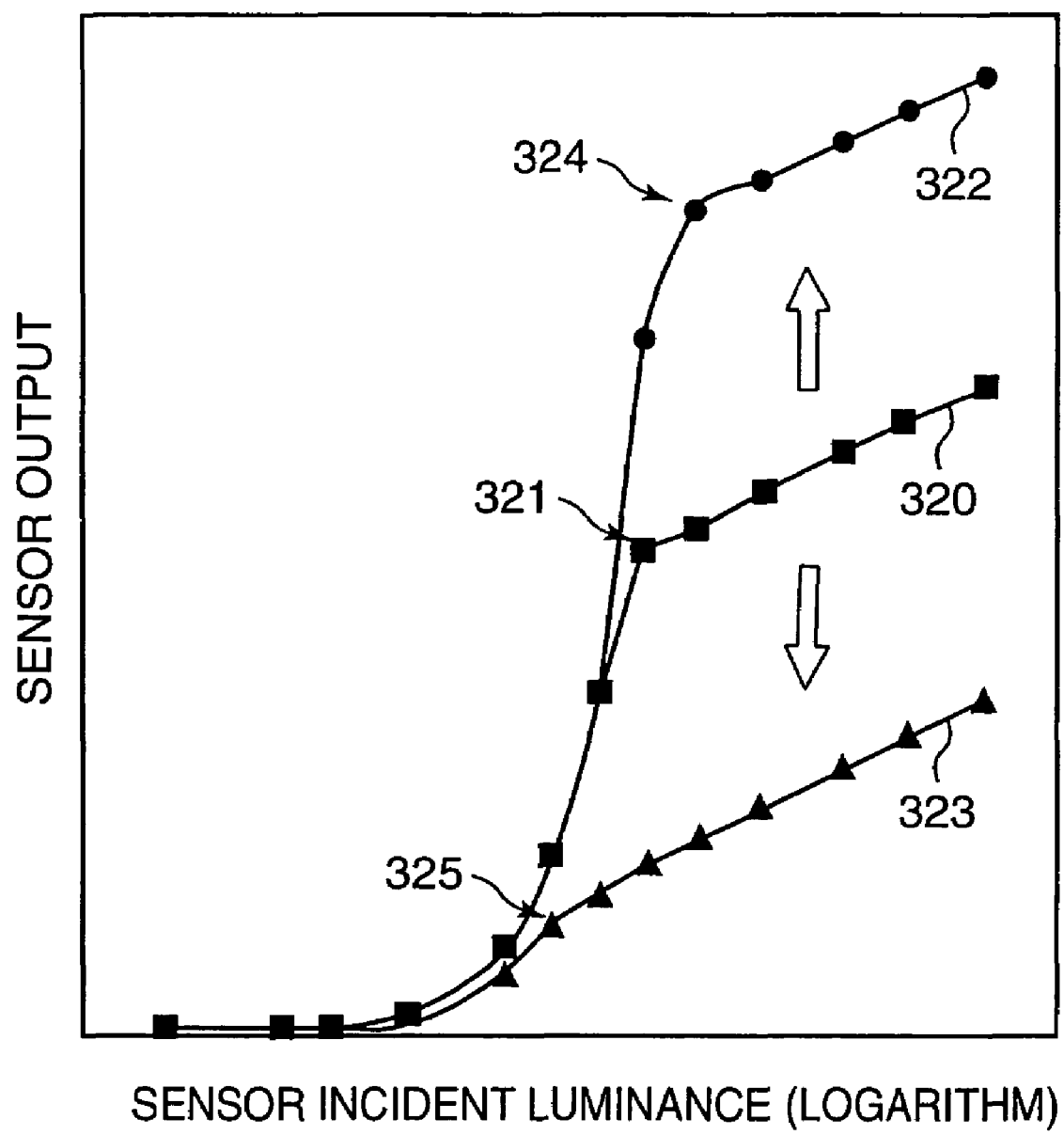
FIG. 8 is an explanatory graph of changes in the photoelectric conversion characteristic.

In this embodiment, the voltage VPH is changed to change ΔVPS so as to change the photoelectric conversion characteristic of the image sensor 30. In FIG. 8, when VPH is increased (ΔVPS is increased), a rate of the linear characteristic region is increased to come closer to the photoelectric conversion characteristic 322. When VPH is reduced (ΔVPS is reduced), a rate of the logarithmic characteristic region is increased to come closer to the photoelectric conversion characteristic 323. This voltage VPH is controlled by the dynamic-range control parameter calculation section 512 through the timing generation circuit 31. Further, a photoelectric conversion characteristic may be changed by adjusting as time ΔT (time period) during which the signal φVPS is supplied to provide the voltage VPH. In this case, a longer time ΔT provides a larger rate of the linear characteristic region, and a shorter time ΔT provides a larger rate of the logarithmic characteristic region. In FIG. 8, a photoelectric conversion characteristic obtained by increasing the time ΔT corresponds to the photoelectric conversion characteristic 322, and a photoelectric conversion characteristic obtained by reducing the time ΔT corresponds to the photoelectric conversion characteristic 323.

A linear/logarithmic image picked up by the image sensor 30 is sent to the signal processing section 40, and subjected to a given signal processing through each processing block (analog signal processing section 401, A/D converter 402 - - - ). Then, the processed signal is sent to the tone transformation section 409. In the tone transformation section 409, the linear/logarithmic image is subjected to a DR compression processing according to the present invention.

Figure 9:
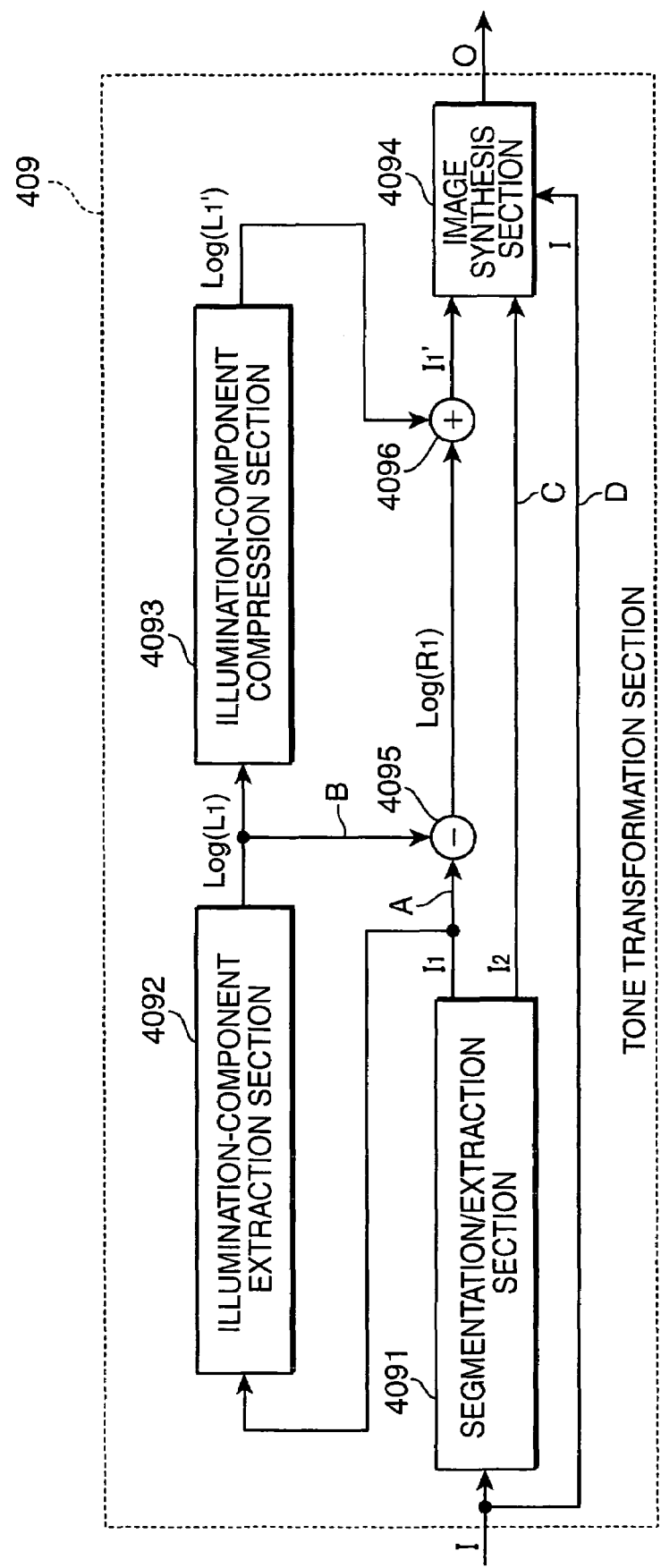
FIG. 9 is an explanatory block diagram of the function of a tone transformation section illustrated in FIG. 2.

FIG. 9 is an explanatory block diagram of the function of the tone transformation section 409 illustrated in FIG. 2. As shown in FIG. 9, the tone transformation section 409 includes a segmentation/extraction section 4091, an illumination component extraction section 4092, an illumination component compression section 4093 and an image synthesis section 4094. The segmentation/extraction section 4091 is operable to segment the linear/logarithmic image (original image I) received by the tone transformation section 409, into a part of the linear/logarithmic image including the logarithmic characteristic region (the entire logarithmic characteristic region, or the entire logarithmic characteristic region and a part of the linear characteristic region), and the remaining linear characteristic region, and extract image data in respective segmented regions (hereinafter be referred to as "images I1, I2").

The illumination component extraction section 4092 is operable to extract an illumination component from the segmented/extracted image (image I1). The illumination component compression section 4093 is operable to subject the illumination component image extracted by the illumination component extraction section 4092, to a compression processing. The image synthesis section 4094 is operable to produce a synthetic image, based on the images I1, I2 segmented/extracted by the segmentation/extraction section 4091, and the original image I. Each operation (computing/processing) of these sections will be described in detail below.

Figure 10:
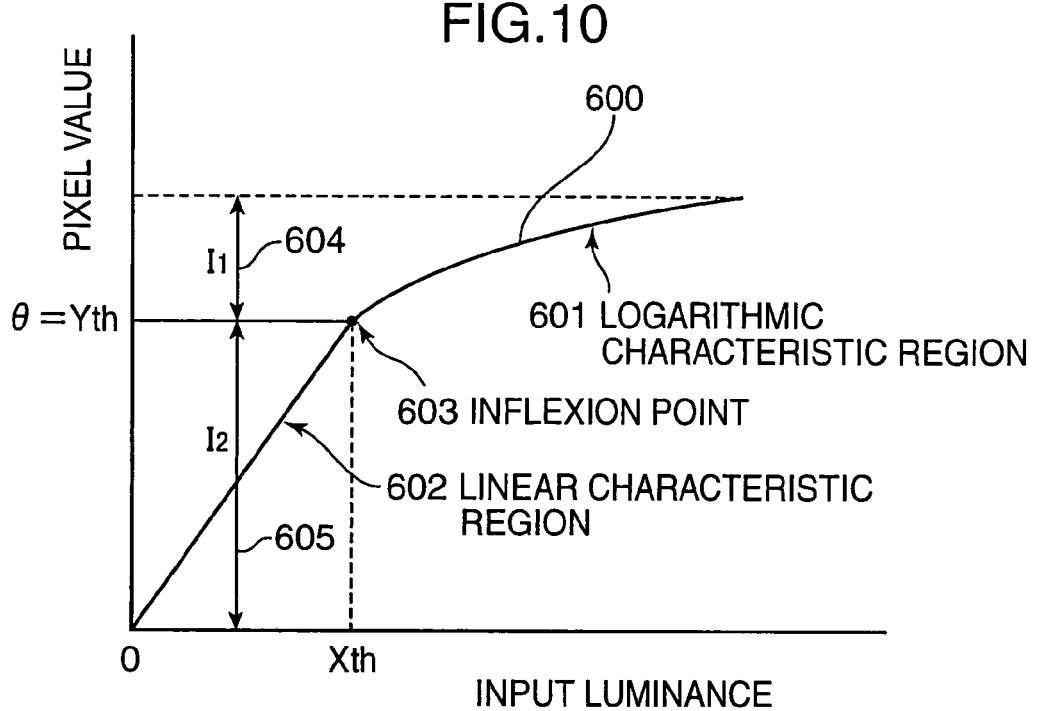
FIG. 10 is an explanatory graph of segmentation/extraction of images I1, I2 from an original image (photoelectric conversion characteristic), on the basis of a border defined by a segmentation parameter θ.

In FIG. 9, the original image I entered in the tone transformation section 409 has a photoelectric conversion characteristic 600 as shown, for example, in FIG. 10. This photoelectric conversion characteristic 600 is expressed as the following formulas (1-1) and (1-2) in a relationship of a pixel value y to an input luminance x (not logarithm). Xth, Yth in FIG. 10 are, respectively, x-coordinate value and y-coordinate value of an inflexion point 603 which is a transfer or transition point between a logarithmic characteristic region 601 and a linear characteristic region 602 of the photoelectric conversion characteristic 600. In FIG. 10, "input luminance" and "pixel value" are equivalent, respectively, to "sensor input luminance" and "sensor output" in FIGS. 7 and 8

$$y=a*x+b (0 \leq x \leq Xth) \quad (1-1)$$

$$y=\alpha*\log(x)+\beta (Xth \leq x) \quad (1-2)$$

[*: multiplication (same in other formulas)]

(Formulas (1-1) and (1-2) express, respectively, the linear characteristic region 602 and the logarithmic characteristic region 601)

As shown in the following condition expressions (2-1) to (2-4), the segmentation/extraction section 4091 is operable to segment a plurality of pixels forming the original image I (in the condition expressions, the original image I is expressed as I(x, y) to indicate that it is a 2-dimensional image) into one region having a pixel value of a given value "θ" or more, and the other region having a pixel value of less than the given value "θ" (based on θ, the original image I is clipped at upper limit and lower limit positions of each of the characteristic regions). This "θ" will hereinafter be referred to occasionally as "segmentation parameter". A value of the segmentation parameter "θ" is set at any value equal to or less than Yth to allow at least the entire logarithmic characteristic region to be included in the image I1, in view of the purpose of providing improved contrast in logarithmic characteristic region, in this embodiment if $(I(x, y) \geq \theta)$ then $$I1(x, y)=I(x, y) \quad (2-1)$$

$$I2(x, y)=0(\text{zero}) \quad (2-2)$$

else $$I1(x, y)=0(\text{zero}) \quad (2-3)$$

$$I2(x, y)=I(x, y) \quad (2-4)$$

end if

This shows that, in the image I (x, y), pixels in a region having a pixel value of θ or more are the image I1 (image I1 (x, y)), and pixels in a region having a pixel value of less than θ are the image I2 (image I2 (x, y))

In response to receiving this original image I, the segmentation/extraction section 4091 performs a segmentation/extraction processing of segmenting the original image I into the image I1 and image I2, according to a value of segmentation parameter θ which is set by segmentation setting section 540 based on instruction information of the manual operation switch 106, etc., or on the basis of a boarder defined by a value of θ as in the following "Case 1: θ=Yth" and "Case 2: θ<Yth". Information for setting the segmentation parameter θ may be preset in the tone transformation section 409 (e.g. in segmentation/extraction section 4091).

Given that an illumination component and a reflectance component of the original image are an illumination component L and a reflectance component R, in the aforementioned Retinex theory, the original image is expressed as the following formula (3-1):

$$I=L*R \quad (3-1)$$

This formula (3-1) relates to the original image I as a linear characteristic image. Thus, for the original image I as a logarithmic characteristic formula, the formula (3-1) has to be modified as expressed as the following formula (4-1):

$$\text{Log}(I)=\text{Log}(L)+\text{Log}(R) \quad (4-1)$$

(Case 1: θ=Yth)

As seen in FIG. 10, when the segmentation parameter θ is Yth, the image I1 having a pixel value of θ (Yth) or more in the original image I is in the logarithmic characteristic region 601 corresponding to the formula (1-2), in a zone 604, and expressed as the following formula (5-1). Further, the image I2 is in the linear characteristic region 602 corresponding to the formula (1-1), in a zone 605.

$$I1=\alpha*\log(x)+\beta \quad (5-1)$$

Given that a pixel value before logarithmic conversion or one of the pixels I1 is "i1", the left-hand side of the formula (4-1) is Log(i1). Based on a modification of the formula (5-1), this Log(i1) is expressed as the following formula (6-1):

$$\log(i1)=(I1-\beta)/\alpha \quad (6-1)$$

The illumination component extraction section 4092 is operable to extract Log(L1) as an illumination component in the image I1 having a pixel value of θ (inflexion point Yth) or more (i.e. a logarithmic value of an illumination component L1 of the image I1). This illumination component can be approximated by a low-frequency component of an image, and therefore expressed as the following formula (7-1):

$$\text{Log}(L1)=F(\log(i1)) \quad (7-1)$$

The transform expressed by "F" means a Gaussian or averaging linear low pass filter (LPF).

While a linear filter is used in this embodiment, the filter is not limited to a specific type, and any other suitable type, for example, such as a non-linear filter, such as median filter, as long as a so-called "blurry image" can be obtained. In this case, even if a nonlinear filter is used, a similar value can be obtained without adverse affects on this processing.

In the calculation of an illumination component, the original image I may be used in place of the image I1. In this case, as compared with using the image I1, a false contour on the boundary between a linear characteristic region and a logarithmic characteristic region of the linear/logarithmic image can be suppressed. This false contour means so-called "tone reversal" due to a step at a transfer or transition point between the linear characteristic region and the logarithmic characteristic region.

Then, the illumination component compression section 4093 is operable to the illumination component Log(L1) extracted by the illumination component extraction section 4092 to a given compression processing, and output a logarithmic value Log(L1') of an illumination component L1' obtained by compressing the illumination component L1. Given that a compression ratio during the DR compression processing (DR compression ratio) is "r", Log(L1') to be output from the illumination component compression section 4093 is expressed as the following formula (9-1):

$$\mathrm{Log}(L1')=\mathrm{Log}(L1)\times r \quad (9\text{-}1)$$

Given that the DR compressed image corresponding to the image I1 is I1', and a reflectance component of the image I1 is R1, the formula (4-1) is expressed as the following formula (10-1):

$$\mathrm{Log}(I1')=\mathrm{Log}(L1')+\mathrm{Log}(R1) \quad (10\text{-}1)$$

The image I1' is expressed as the following formula (11-1) with given normalization factor "n":

$$I1'=\exp(\mathrm{Log}(L1')+\mathrm{Log}(R1))\times n \quad (11\text{-}1)$$

In the above formulas Log(R1) is obtained by subtracting the illumination component L1 transmitted from a route B from the image I1 transmitted through a route A, through a subtraction section indicated by the reference numeral 4095 (subtraction section 4095), as shown in FIG. 9. Further, the image I1' is obtained by adding the compressed illumination component Log(L1') from the illumination component compression section 4093 and the reflectance component Log(R1) from the subtraction section 4095, through an addition section indicated by the reference numeral 4095 (addition section 4096). While the above description uses an expression such that an image is transmitted through a route, an image data signal (video signal) is actually applied to the entire area of a corresponding route.

The image synthesis section 4094 is operable to produce a synthetic image O, based on the image I1' obtained by the above processing, the image I2 transmitted through a route C, and the original image I transmitted through a route D. In an actual processing, a synthetic image O is produced from the image I1' and the original image I without using the image I2. In this case, a synthetic image O is produced through a processing (rewrite processing) of replacing a region having a pixel value of θ or more in the original image I, with the image I1'.

While the above modification is designed (has a circuit configuration) to produce a synthetic image from the image I' and the original image I without using the image I2, the route D may be omitted, and the original image I may include the image I2 transmitted through the route C (i.e. the original image I is replaced with the image I2). In this case, the mage I2 (=the original image I) and the image I' may be synthesized to produce a synthetic image O.

(Case 2: θ<Yth)

As shown in FIG. 1, when the segmentation parameter θ is less than Yth, the image I1 having a pixel value of θ (=Yth) or more in the original image I is in a zone 607 consisting of the logarithmic characteristic region 601 (zone 604) and a part of the linear characteristic region 602 (zone 606). The image I2 is in a zone 608. In this case, the segmentation/extraction section 4091 performs a segmentation/extraction processing of the image I1 and the image I2 from the original image I in this manner. In the following description, the image I1 additionally including a part of the linear characteristic region will be referred to occasionally as "partial-linear/logarithmic image B1".

Preferably, the segmentation parameter θ satisfying the relation of θ<Yth is set at a position adjacent to the inflexion point in the linear characteristic region, or at a position adjacent to the logarithmic characteristic region. In an actual shooting operation, the linear characteristic region has already been adjusted in its optimal state (for example, a state capable of providing optimal exposure value and contrast) through the aforementioned AE control. Thus, the segmentation parameter θ is set at a position allowing an after-mentioned overlapping zone with the original image I to be obtained so as to facilitate an image processing for enhancing contrast in the logarithmic characteristic region while maximally maintaining the partial linear characteristic region, to suppress a false contour which would otherwise occur at the boundary between the linear characteristic region and the logarithmic characteristic region (connection of characteristic lines).

The illumination component extraction section 4092 is operable to extract an illumination component from the partial-linear/logarithmic image B1. This illumination component includes respective illumination component of the logarithmic characteristic region and the partial linear characteristic region. Given that the illumination components of the logarithmic characteristic region and the partial linear characteristic region in the partial-linear/logarithmic image B1 are, respectively, Log(La) and Lb (reflectance components thereof are, respectively, Log(Ra) and Rb), the illumination component compression section 4093 is operable to subject the illumination component to a DR compression processing. Specifically, as to Log(La), the DR compression processing is performed in the same manner as the formula (9-1), and further as shown in the following formula (12-1):

$$\mathrm{Log}(La')=\mathrm{Log}(La)\times r \quad (12\text{-}1)$$

As to Lb, the DR compression processing is performed as shown in the following formula (12-2):

$$Lb'=\exp(\mathrm{Log}(Lb)\times c) \quad (12\text{-}2)$$

wherein c is a DR compression ratio in the linear characteristic region.

The illumination components Log(La'), Lb' collectively correspond to Log(L1') illustrated in FIG. 9, [Log(La) and Lb collectively correspond to Log(L1)], and the reflectance components Log(Ra), Rb collectively correspond to Log(R1). That is, the image I1 in the case of θ<Yth includes the linear characteristic image and the logarithmic characteristic image. Thus, in this embodiment, it may be considered that the illumination components Log(L1), the compressed illumination components Log(L1') and the reflectance components Log(R1) also includes the linear characteristic image and the logarithmic characteristic image. The DR compression processing as shown in the formula (12-2) is the same as that in an after-mentioned second embodiment, and its description will be omitted herein.

The logarithmic characteristic image in the zone 604 and the linear characteristic image in the zone 606 in the image I1 (partial-linear/logarithmic image B1) are DR-compressed by the illumination component compression section 4093. The respective illumination components of the logarithmic characteristic region and the partial-linear characteristic region are defined as Log(La'), Lb', and described as separate components. Differently, in an actual DR compression processing, Log(La'), Lb' are synthesized as a single Log(L1), and this Log(L1) is subjected to the DR compression processing. Thus, the logarithmic characteristic region is DR-compressed together with the partial-linear characteristic region. This makes it possible to suppress (prevent) a false contour which would otherwise occur at the boundary between the logarithmic characteristic region and the partial-linear characteristic region during the DR compression processing.

As with the Case 1, the image synthesis section 4094 is operable to produce a synthetic image O, based on the image I1' obtained by subjecting the image I1 to the DR compression processing (corresponding to the image I1' illustrated in FIG. 9), the image I2 and the original image I (corresponding to the original image I on the route D illustrated in FIG. 9). (In an actual operation, an synthetic image O may be produced using the image I1' and the original image I without using the image I2. In this case, the route D may be omitted, and the image I2 may be handled as the original image I, as with the Case 1.

Figure 12:
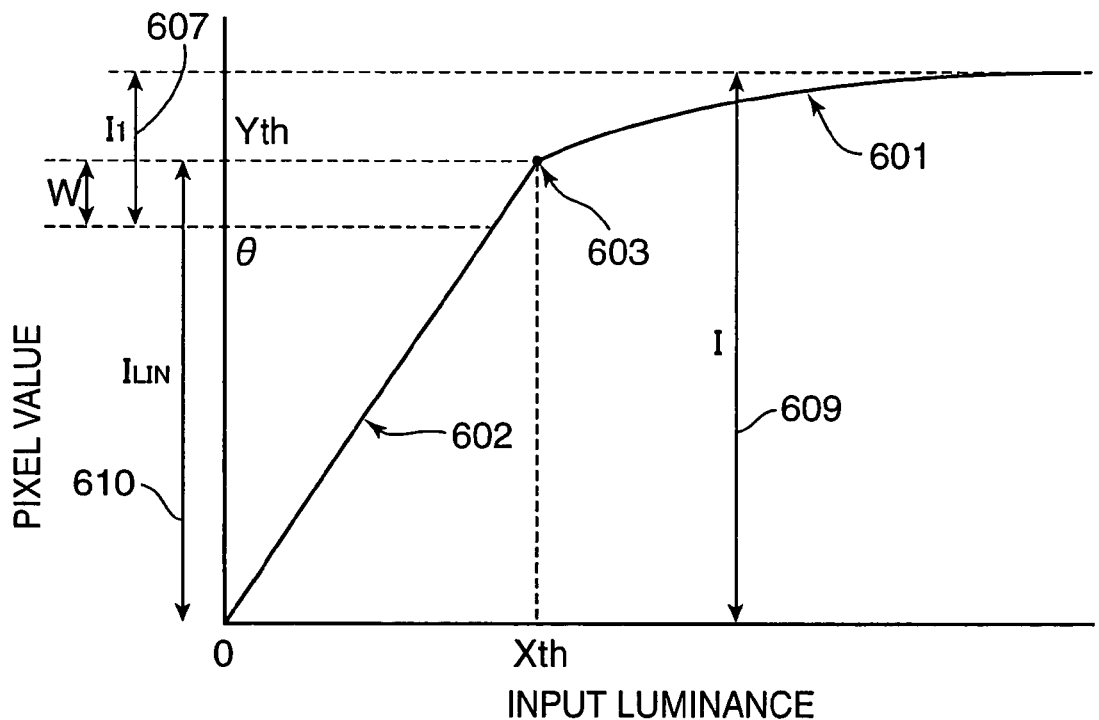
FIG. 12 is an explanatory graph of production of a synthetic image O based on an image I1' and an original image I.

Differently from the Case 1, as shown in FIG. 12, in the process of producing the synthetic image O based on the image I1' (image I1 in the zone 607) and the original image I (zone 609) in the Case 2, an overlapping zone W (will exist between the partial-linear characteristic region of the image I1' and the linear characteristic region (linear characteristic image $I_{LIN}$ indicated by "610") of the original image I. This "overlapping zone" has two meanings: spatially overlapping zone; and overlapping zone in terms of luminance. In this embodiment, the overlapping zone W shows an overlapping zone in terms of luminance. Thus, the image synthesis section 4094 is operable to replace a region having a pixel value of θ or more in the original image I with the entire logarithmic characteristic region of the image I1', and to replace the overlapping zone with an image obtained through the following syntheses processing with the original image I.

A syntheses of the original image I and the image I1' in the overlapping zone is performed, for example, through summing/averaging, or weighted averaging as shown in the following formula (13-1):

$$Iw=(I1'+I_{LIN})/2, \quad (13\text{-}1)$$

wherein Iw is image data in an overlapping zone W of a synthetic image O.

Figure 13:
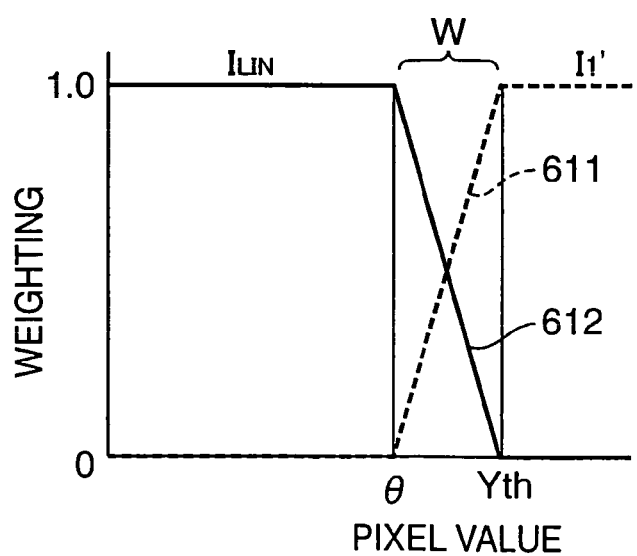
FIG. 13 is an explanatory graph of a weighted average processing for an overlapping zone illustrated in FIG. 12.

The technique for the syntheses of the original image I and the image I1' (calculation of the image Iw in the overlapping portion W) is not limited to summing/averaging. For example, a weighted average processing may be used. In this weighted average processing, each weight of the image $I_{LIN}$ and the image I1' is adjusted depending on a positional relation between the pixel value θ and Yth. For example as shown in FIG. 13, when the pixel value corresponds to "θ", the image $I_{LIN}$ is 100% used (weight of $I_{LIN}$=1.0/weight of I1'=0). As the pixel value comes close to Yth, weight of I1' is increased, and weight of $I_{LIN}$ is reduced. When the pixel value finally corresponds to Yth, the image I1' is 100% used (weight of $I_{LIN}$=0/ weight of I1'=1.0). In the graph showing changes of weighting in the overlapping zone in FIG. 13, what is a key point is that weight of $I_{LIN}$ is 100% when the pixel value corresponds to θ, and weight of I1' is 100% when the pixel value corresponds to Yth. In stead of straight lines as indicated by "611", "612", weighting ratio may be changed in a given curve characteristic. In this case, it is not essential to change the weight of $I_{LIN}$ in association with the weight of I1' (variation in weight may be set individually).

Figure 14:
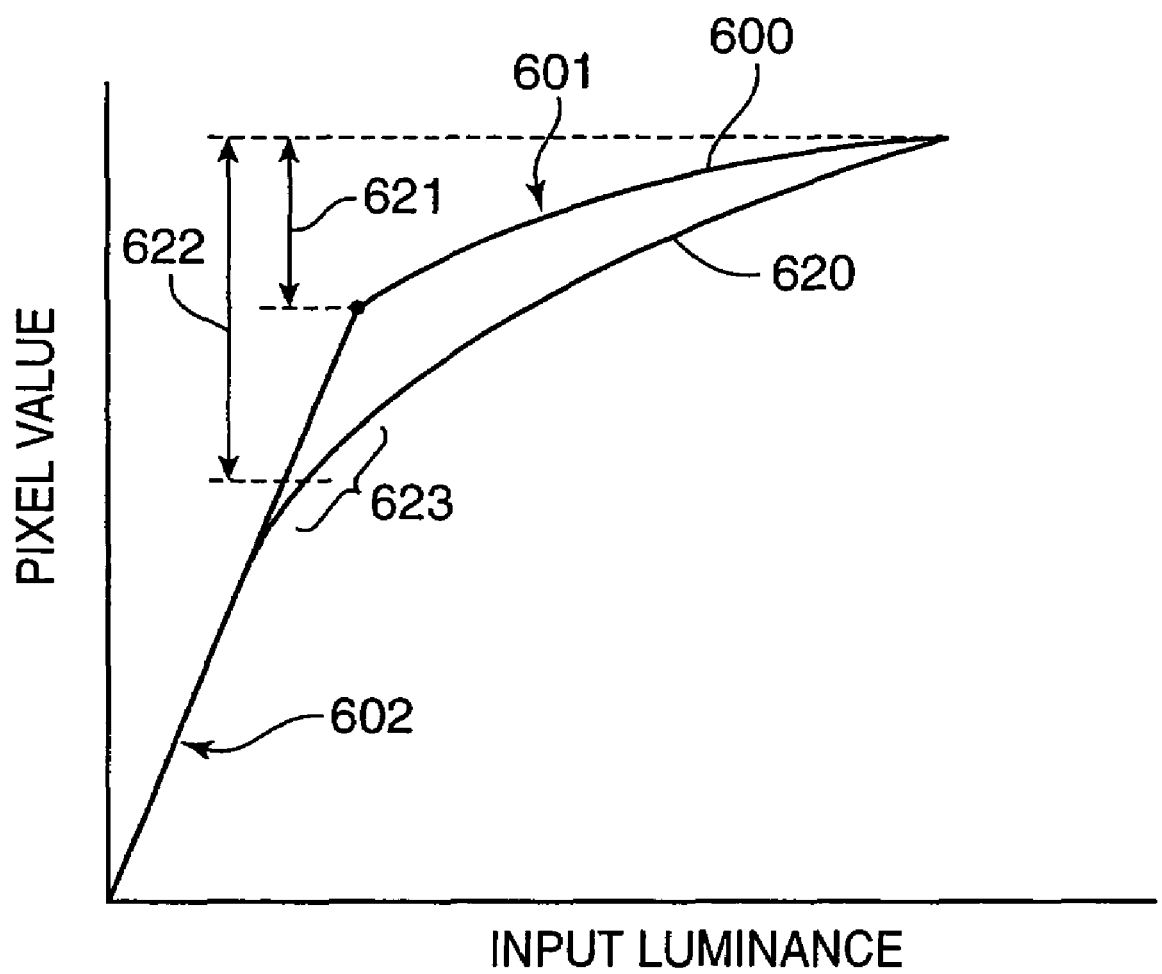
FIG. 14 is an explanatory graph of changes in the photoelectric conversion characteristic resulting from a DR compression processing in the image sensing apparatus according to the first embodiment.

In this embodiment, through the DR compression processing (tone transformation processing), the photoelectric conversion characteristic 600 before the DR compression processing is changed, for example a conversion characteristic 620 as shown in FIG. 14. FIG. 14 shows the result obtained when overlapping zone is subjected to weighted averaging. Thus, as indicated by "623", the overlapping zone is in so-called standing state. This change allows a pixel value width in logarithmic characteristic region to be increased from a width "621" to a width "622". This makes it possible to provide an increased pixel value width in logarithmic characteristic region increase the range of pixel values in terms of the entire photoelectric conversion characteristic, while maintaining the linear characteristic region 602 (maintaining inclination and shape in linear characteristic graph) or while preventing excessively enhanced contrast or loss in the linear characteristic region 602. Thus, image data subjected to the DR compression processing in such a manner as to provide improved (enhanced) in the contrast logarithmic characteristic region can be utilized, for example, to provide an enhanced display with high image quality.

Figure 15:
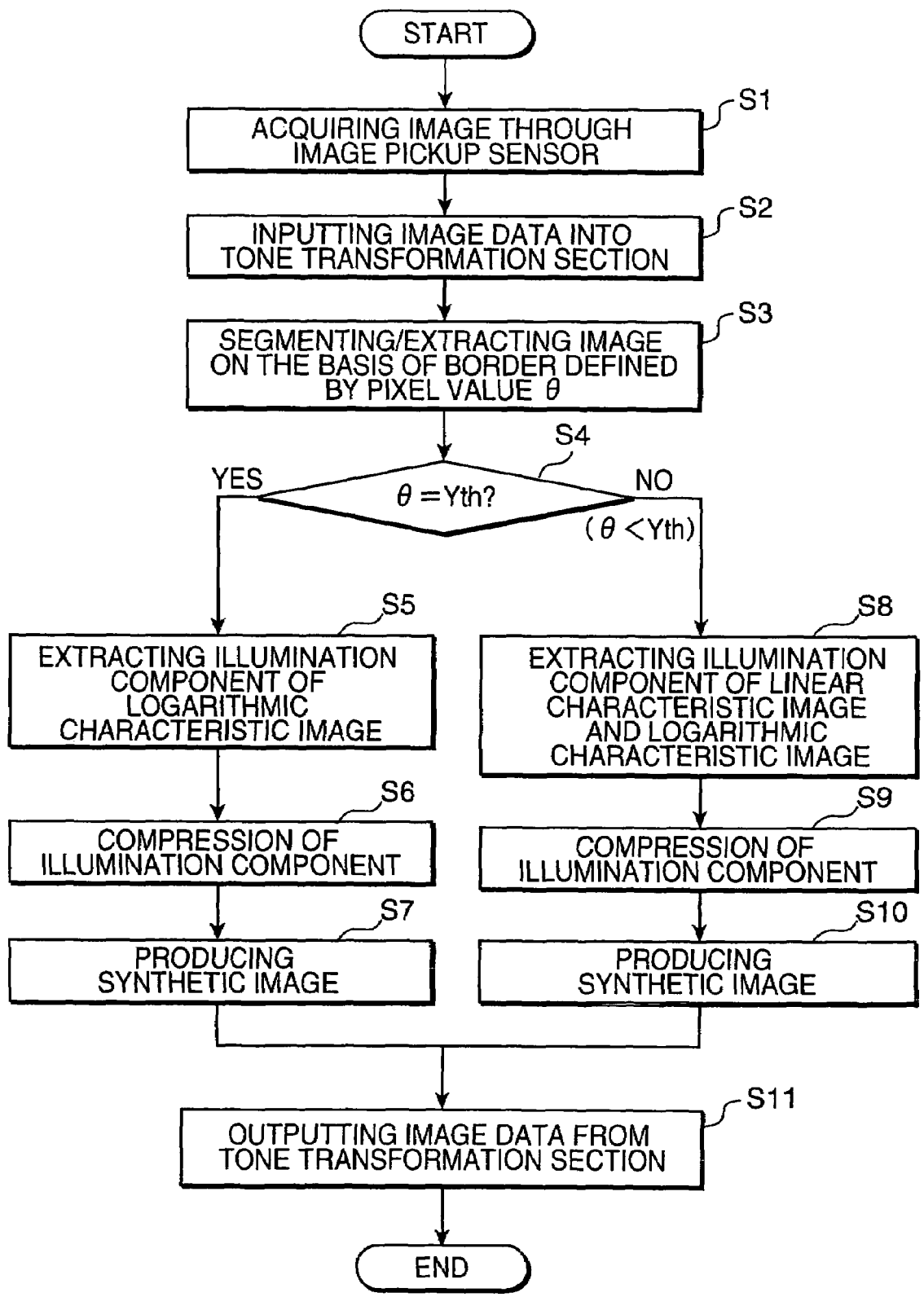
FIG. 15 is a flowchart showing one example of a DR compression processing in the tone transformation section of the digital camera.

FIG. 15 is a flowchart showing one example of a DR compression processing in the tone transformation section 409 of the digital camera 1. Firstly, a linear/logarithmic image is obtained through an image sensing operation of the image sensor 30 (Step S1). This linear/logarithmic image data is sent to the signal processing section 40. In the signal processing section 40, the linear/logarithmic image data is subjected to a given signal processing in each processing block, such as the analog signal processing section 401, and output to the tone transformation section 409 (Step S2). Then, the linear/logarithmic image (original image I) is segmented into an image I1 of a logarithmic characteristic region (an image I1 including a part of the linear characteristic region (=B1)), and an image I2 of a linear characteristic region, on the basis of a border defined by a segmentation parameter θ, and the images I1, I2 are extracted from the original image I, through the segmentation/extraction section 4091 (Step S3). When a value of the segmentation parameter θ is set to a position Yth of an inflexion point (YES in Step S4), an illumination component Log(L1) of the image I1 of the logarithmic characteristic region is extracted though the illumination component extraction section 4092 (the extracted illumination component Log(L1) is subtracted from the image I1 through the subtraction section 4095 to provide a reflection component Log(R1)) (Step S5). Then, the illumination component Log (L1) extracted in Step S5 is subjected to a compression processing through the illumination component compression section 4093, to be formed as an illumination component Log(L1') (the compressed illumination component Log(L1') is added to the reflection component Log(R1) through an addition section 4096) so as to obtain an image I1' (Step S6). Then, through image synthesis section 4094, a synthetic image O is produced based on the images I1', I2 and the original image I (In this step, a processing of replacing a region having a pixel value of θ or more in the original image I with the image I1' is performed) (Step S7).

When the value of the segmentation parameter θ is set to a position Yth of an inflexion point (No in Step S4), respective illumination components Log(La), Lb (collectively corresponds to Log(L1') of the image I1 consisting of a logarithmic characteristic region and a partial linear characteristic region (image B1) are extracted through the illumination component extraction section 4092 (the extracted illumination component Log(La) is subtracted from the image I1 through the subtraction section 4095 to provide a reflection component Log(Ra), Rb) (Step S8). Then, the illumination component Log(La), Lb extracted in Step S8 is subjected to a compression processing through the illumination component compression section 4093, to be formed as an illumination component Log(La'), Lb' (the compressed illumination component Log(La'), Lb' is added to the reflection component Log(Ra), Rb through an addition section 4096) so as to obtain an image I1' (Step S9). Then, through image synthesis section 4094, a synthetic image O is produced based on the images I1', I2 and the original image I (In this embodiment, a synthetic image O is produced based on the original image I and the image I1', and overlapping zone between the images is subjected to summing/averaging or weighted averaging through image synthesis section 4094) (Step S1). Then, the synthetic image O is output from the tone transformation section 409 to the image memory 411 and/or the LCD display 107 (Step S11).

Second Embodiment

Figure 16:
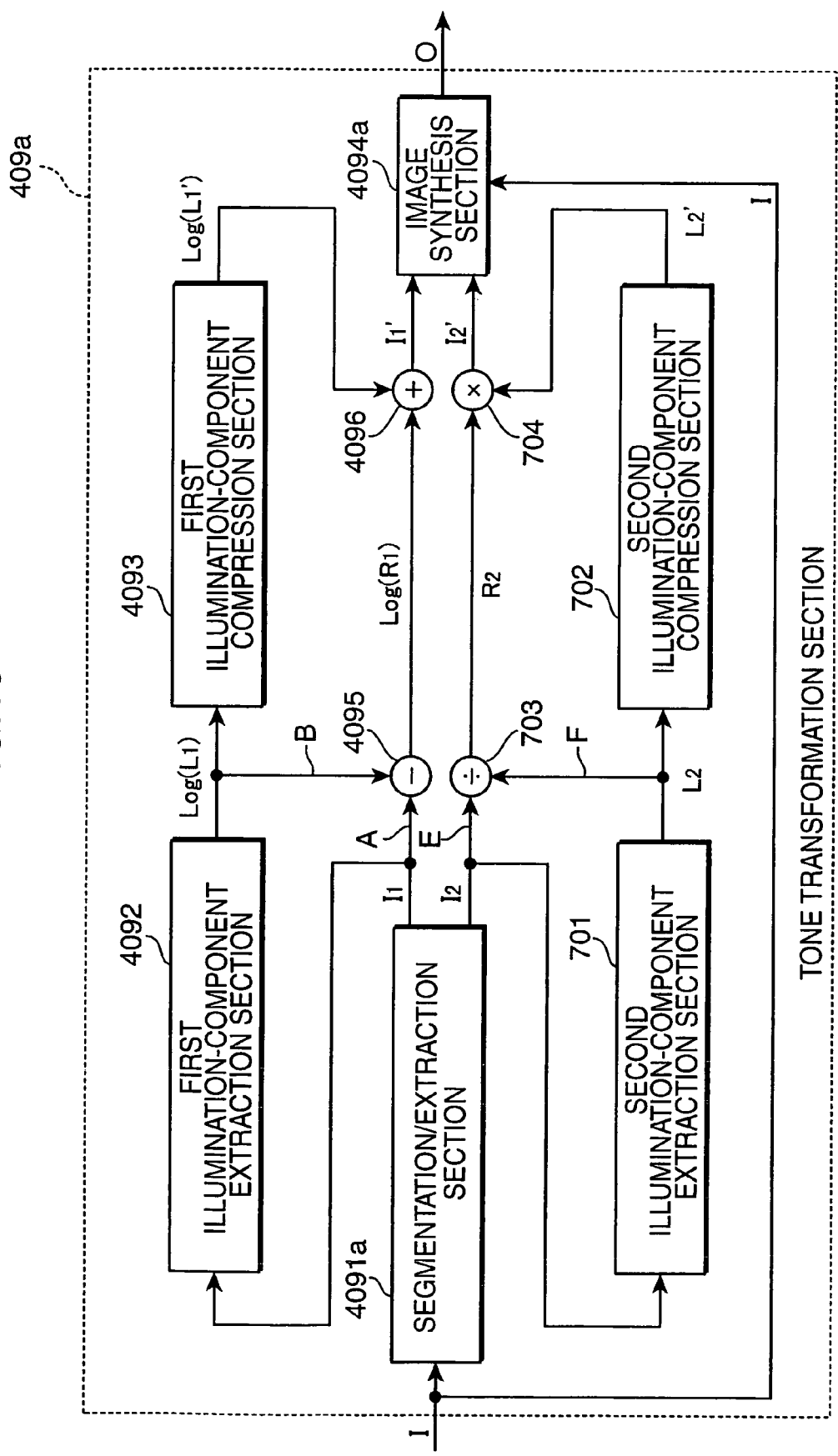
FIG. 16 is an explanatory block diagram of the function of a tone transformation section of a digital camera according to a second embodiment of the present invention.

FIG. 16 is an explanatory block diagram of the function of a tone transformation section 409$a$ of a digital camera 1$a$ according to a second embodiment of the present invention. As shown in FIG. 16, in general, the tone transformation section 409$a$ is different from the tone transformation section 409, in a point of comprising a circuit (processing block) for subjecting an image I2 to an illumination-component extraction processing and an illumination-component compression processing. The same component or element as that in the tone transformation section 409$a$ is defined by the same reference numeral, and its description will be omitted, except that an illumination component extraction section 4092 for an image I1 is defined as a first illumination component extraction section 4092, and an illumination component compression section 4093 is defined as a first illumination component compression section 4093, only for simplifying the explanation.

The tone transformation section 409$a$ comprises a segmentation/extraction section 4091$a$, a second illumination component extraction section 701, a second illumination component compression section 702, and an image synthesis section 4094$a$. As with the segmentation/extraction section 4091, the segmentation/extraction section 4091$a$ is operable to segment an original image I input to tone transformation section 409$a$ into two regions a logarithmic characteristic region and a partial linear characteristic region, on the basis of a segmentation parameter θ, and extract the segmented images I1 and I2 from the original image. In the second embodiment, the tone transformation section 409$a$ is designed to subject the image I2 of the linear characteristic region to each illumination component extraction and compression processing, so that, even under the condition of θ<Yth (overlapping zone), the linear characteristic region and the logarithmic characteristic region are (smoothly) connected together adequately without taking measures therefor. Thus, the segmentation parameter θ is fixedly set at a value of Yth. Then in the same manner as that in the first embodiment, the original image I is subjected to a segmentation/extraction processing to segment and extract the image I1 of the zone 604 and the image I2 of the zone 605 illustrated in FIG. 10 on the basis of the θ (=Yth: inflexion point).

The image I1 extracted by the segmentation/extraction section 4091$a$ is subjected to a DR compression, through the first illumination component extraction section 4092 and a first illumination component compression section 4093 (and a subtraction section 4095, an addition section 4096), in the same manner as that in the first embodiment, so as to provide an image I1'. The obtained image I1' is input to the image synthesis section 4094$a$. The image I2 is subjected to a DR compression processing in the following manner, through the second illumination component extraction section 701 and the second illumination component compression section 702, so as to provide an image I2'. The obtained image I2' is input to the image synthesis section 4094$a$.

As showing FIG. 16, the second illumination component extraction section 701 is operable to extract an illumination component L2 from the image I2 extracted by the segmentation/extraction section 4091$a$. This processing of extracting the illumination component L2 from the image I2 is expressed by the following formula (14-1).

$$L2=F(I2) \quad (14\text{-}1)$$

As with the first embodiment, the "F" means a Gaussian or averaging linear low pass filter. This filter may be a non-linear filter, such as median filter. A reflectance component R2 of the image I2 is obtained R2=I2/L2 (see the formula (3-1))

The second illumination component compression section 702 is operable to subject the illumination component L2 obtained through the second illumination component extraction section 701 to a given compression processing so as to a compressed illumination component L2'. Given that a DR compression ratio is "c", this compressed illumination component L2' is derived by the following formula (15-1):

$$L2'=\exp(\text{Log}(L2)*c) \quad (15\text{-}1)$$

The compressed illumination component L2' obtained through the second illumination component compression section 702 is multiplied by the reflectance component R2 through multiplication section indicated by the reference numeral 704 (multiplication 704) so as to provide a DR-compressed image I2' corresponding to the image I2. A reflectance component R2 is obtained by subtracting the illumination component L2 transmitted through route F from the image I2 transmitted through a route E.

The image synthesis section 4094$a$ is operable to produce a synthetic image, based on the DR-compressed image I1' corresponding to the image I1 and the original image I (transmitted through route G). In this case, firstly the image I1' and the I2' are synthesized to form an image I'. This image I' is expressed by the following formulas ((16-1), (16-2)):

if $(I(x, y) \geq Yth)$ then $$I'(x, y)=I1'(x, y) \quad (16\text{-}1)$$

else $$I'(x, y)=I2'(x, y) \quad (16\text{-}2)$$

end if

Then, a synthetic image O is produced from the image I' and the original image I. This synthetic image O based on the image I' and the original image I is performed, for example, through the following methods (a) to (c).

<Method (a)>

Figure 17:
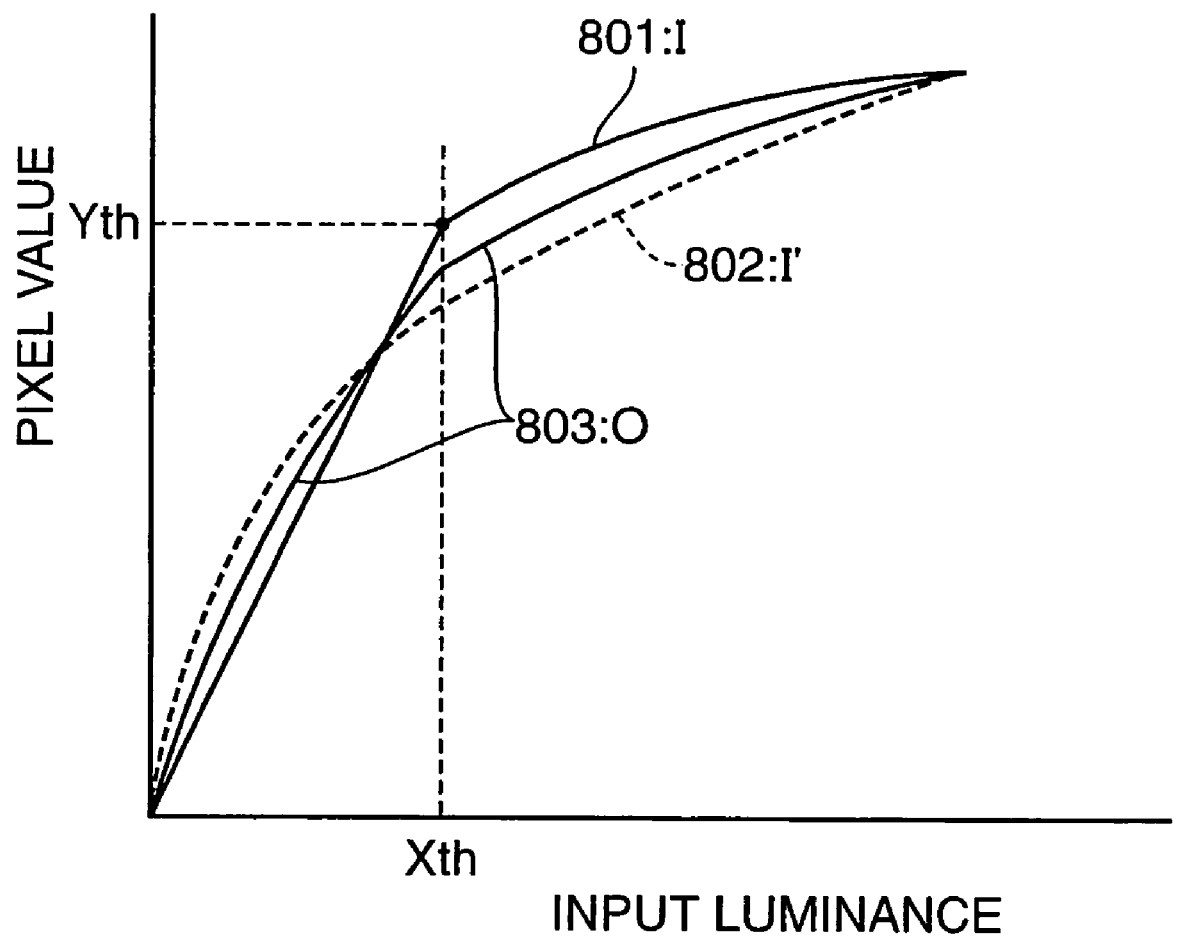
FIG. 17 is an explanatory graph of production of a synthetic image O based on an image I1' and an original image I.

As shown in FIG. 17, given that a photoelectric conversion characteristic indicated by "801" (photoelectric conversion characteristic 801) is an original image I, and a photoelectric conversion characteristic indicated by "802" (photoelectric conversion characteristic 802) is an image I', a synthetic image O is formed by averaging (intermediate value; summing/average) the image I and the image I', as shown in the following formula (17-1). In this case, the synthetic image O is expressed by a photoelectric conversion characteristic as indicated, for example, by "803".

$$O=(I(x, y)+I'(x, y))/2 \quad (17\text{-}1)$$

Instead of the simple summing/averaging as shown in formula (17-1), a method of averaging the image I and the image I' at a given ratio may be used. Specifically, they may be averaged using the following formula (17-1)':

$$O=(1*I(x, y)+2*I'(x, y))/3 \qquad (17\text{-}1)'$$

<Method (b)>

As shown in FIG. 18, given that a photoelectric conversion characteristic 801 is an original image I, and a photoelectric conversion characteristic 802 is an image I', a synthetic image O is expressed by the following condition expression ((18-1), (18-2)):

if $(I(x, y) \geq Xth)$ then $$O=(I(x, y)+I'(x, y)/2 \qquad (18\text{-}1)$$

else (or $I(x, y)<Xth$)

$$O=I \qquad (18\text{-}2)$$

end if

Figure 19A:
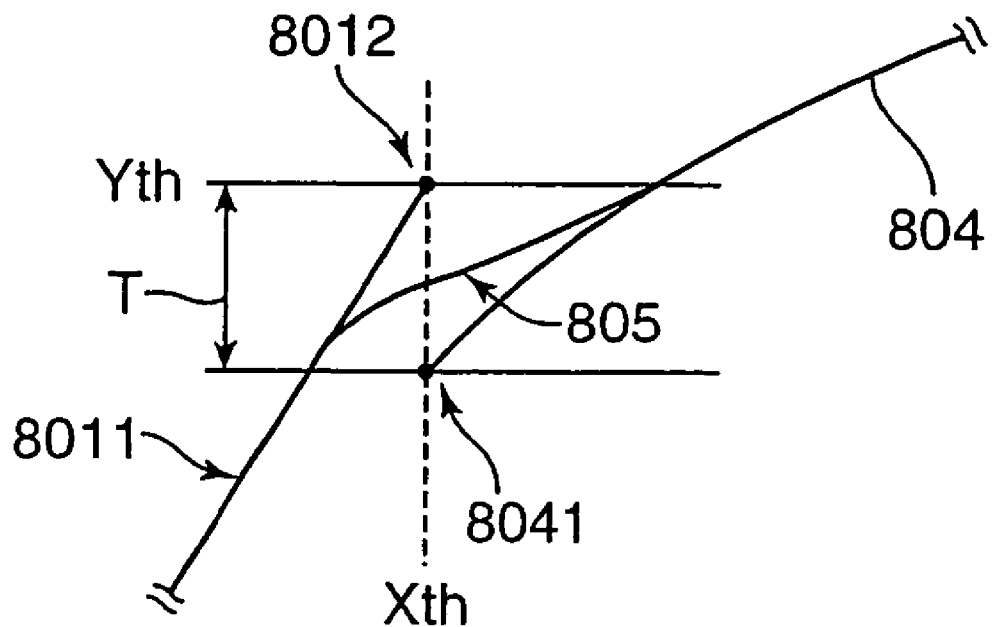
FIGS. 19A and 19B are explanatory graphs of a processing for connecting respective connection zones of images at an inflexion point illustrated in FIG. 18.

In FIG. 18, a synthetic image O is formed of a linear characteristic region indicated by "8011" in the photoelectric conversion characteristic 801 corresponding to the formula (18-2) (linear characteristic 8011) (original image I), and a conversion characteristic 804 corresponding to the formula (18-1) (corresponding to the partial logarithmic characteristic region of the photoelectric conversion characteristic 803 in FIG. 17). In this case, a step will be created at a connection (end point 8012 and end point 8041) between the linear and the characteristic 8011 and the conversion characteristic 804. However, as shown in FIG. 19A, in the same manner as the weighted averaging described in connection with FIGS. 12 and 13 in the first embodiment, this step can be smoothly connected (as shown in the characteristic graph of the connection 805) by subjecting the respective images of the linear characteristic 8011 and the characteristic 804 in a overlapping zone T.

The synthetic image O based on the original image I and the image I' and may be expressed by the following formulas ((19-1), (19-2)).

if $(I(x, y) \geq Yth)$ then $$O=(I(x, y)+I'(x, y))/2 \qquad (19\text{-}1)$$

else (or $I(x, y)<Yth$)

$$O=I \qquad (19\text{-}2)$$

end if

Figure 19B:
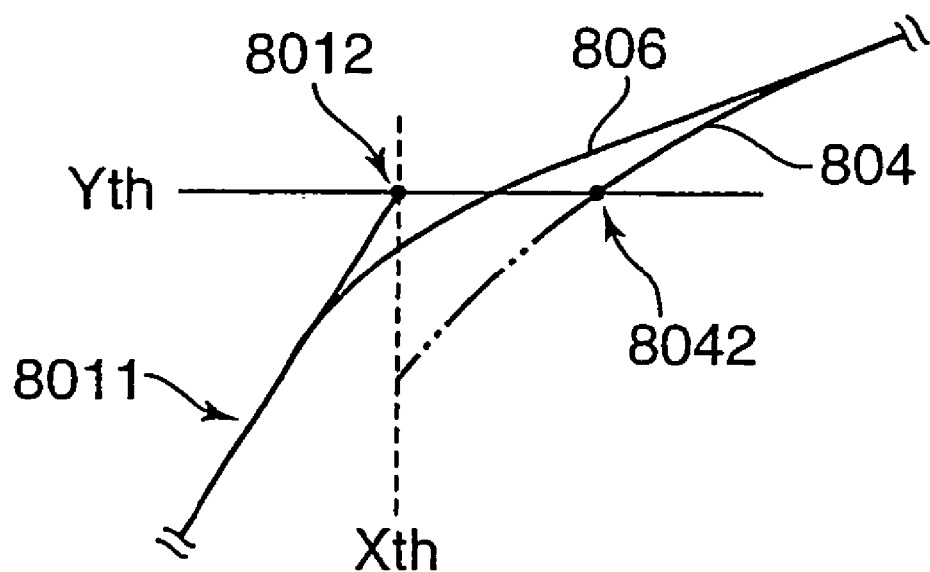

In this case, as shown in FIG. 19B, the connection (end point 8012 and end point 8041) between the linear characteristic 8011 and the conversion characteristic 804 may be smoothly connected using a given coefficient (weighting factor), as shown in the characteristic graph of the connection portion 806.

Instead of the simple summing/averaging as shown in formula (19-1), a method of averaging the image I and the image I' at a given ratio may also be used. Specifically, they may be averaged using the following formula (19-1)':

$$O=(1*I(x, y)+2*I'(x, y))/3 \qquad (19\text{-}1)'$$

<Method (c)>

As shown in FIG. 20, given that a photoelectric conversion characteristic 801 is an original image I, and a photoelectric conversion characteristic 802 is an image I', a synthetic image O is expressed by the following condition expression ((20-1), (20-2)):

if $(I'(x, y)/I(x, y)>e)$ then $$O(x, y)=I(x, y) \qquad (20\text{-}1)$$

else $$O(x, y)=I'(x, y) \qquad (20\text{-}2)$$

end if

In the condition expression, "e" represents highlight ratio (gain), and is a value of "0" or more. Typically, in DE compression, a value of I'(x, y)/I(x, y) is 1.0 or more. For example, the gain e is set at "1.0". In this case, when the image I' has a greater gain that that of the original image I, the image I' having a less gain is selected. When the image I' has a less gain than that of the original image I, the image I is selected. In this manner, a characteristic to be used as a synthetic image O (the image I' or the original image I) is selected. Thus, the synthetic image O can be obtained by synthesizing the partial characteristic region indicated by "812" in the photoelectric conversion characteristic 801, and the characteristic region indicated by "811" in the photoelectric conversion characteristic 802.

The Method (c) is intended to produce a synthetic image while satisfying the need for maintaining a linear characteristic region in an original image even if being subjected to a DR compression processing (or for keeping a characteristic graph from being changed to particularly enhanced contrast). As shown in FIG. 20, a region having I'(x, y)/I(x, y)>1.0 (=e) after a DR compression processing generally exists in the range (zone) which is less than an inflexion point (Yth). Thus, when "e" in the above condition expression is set at 1.0, a linear characteristic region to be used in a synthetic image O is not the image I' of the characteristic region indicated by "813", but the original image I of the characteristic region indicated by "812". This makes it possible to adequately satisfy the need for maintaining a linear characteristic region. As above, when "e" in the above condition expression is 1.0, a gain in a linear characteristic region is not increased by a DR compression processing, and therefore an output image (synthetic image O) never has S/N ratio less than that of an original image.

This allows a pixel value width in logarithmic characteristic region to be increased from a width "814" to a width "815", while maintaining a current level of linear characteristic region without undesirable change in characteristic graph and excessively enhanced contrast.

If it is necessary to more reliably maintain a linear characteristic region during a DR compression processing, in front of the if (I'(x, y)/I(x, y)>e), a condition "if (I(x, y)<Yth), then" may be added. In this case, when an image I' and image I for use in a synthetic image is selected within the range of I(x, y)≧Yth), an image I' meeting a predetermined fixed value may be selected. Further, such a selection may be made based on (I'(x, y)/I(x, y)>e).

Figure 21:
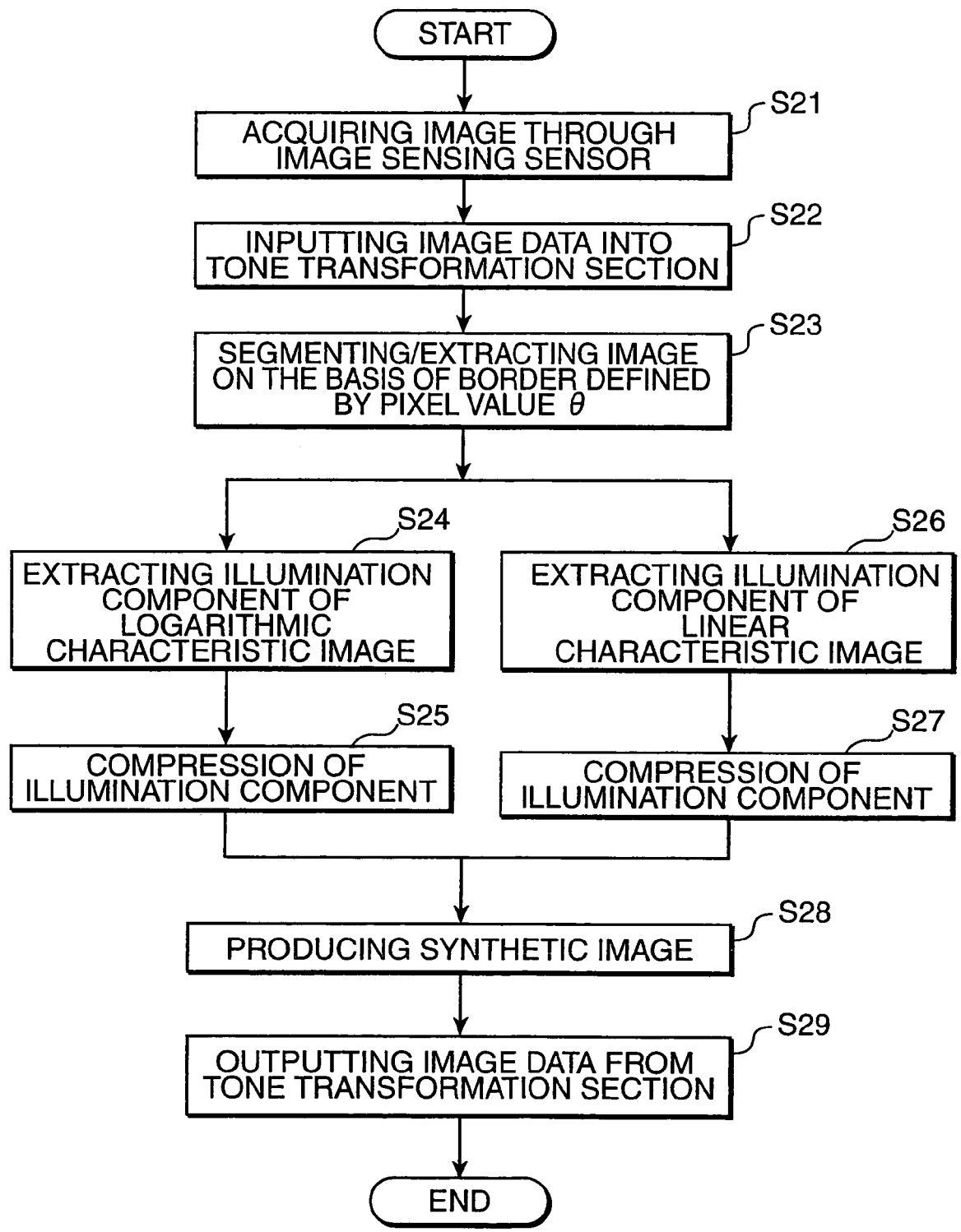
FIG. 21 is a flowchart showing one example of a DR compression processing in the tone transformation section of the digital camera employing the image sensing apparatus according to the second embodiment.
Figure 23:
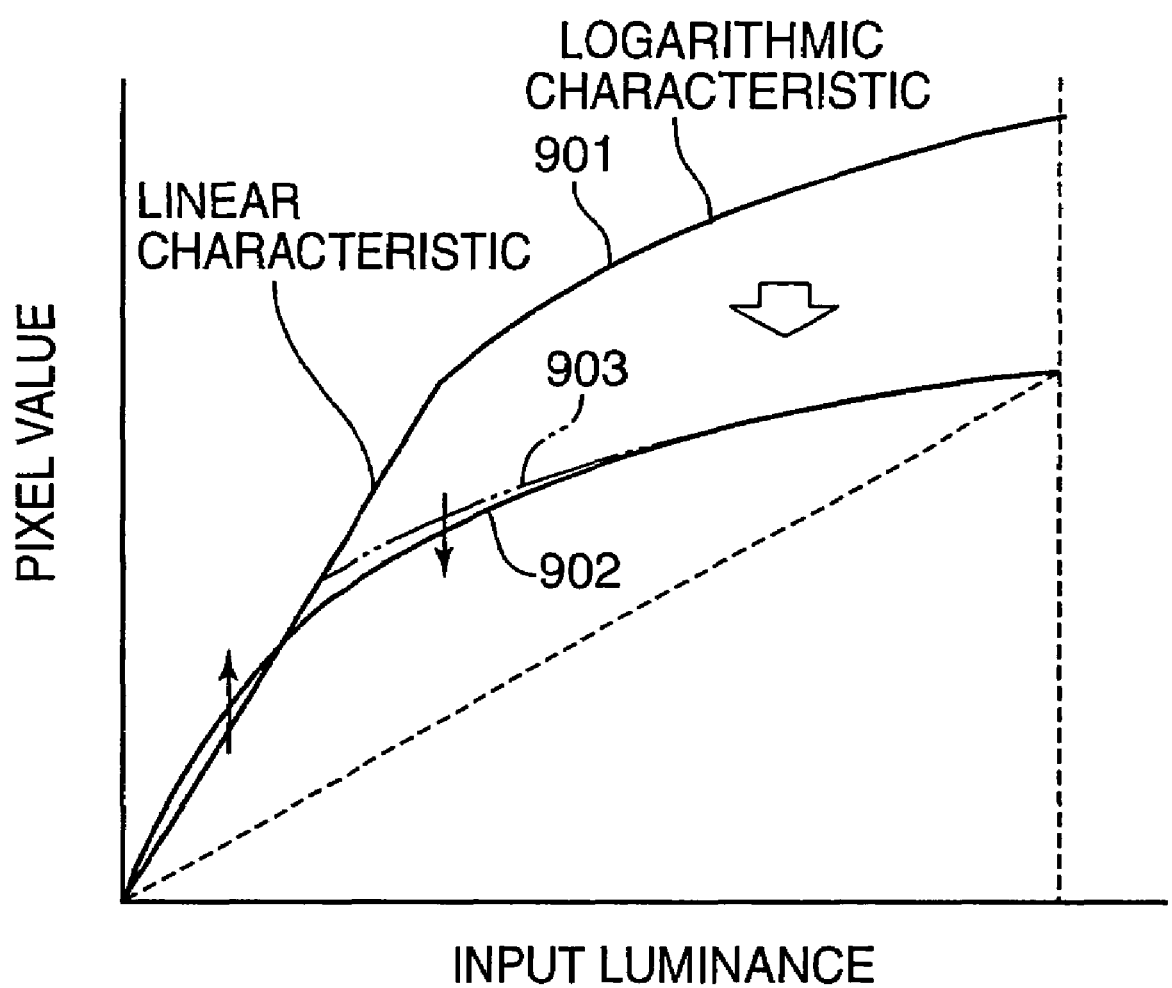
FIG. 23 is an explanatory graph of changes in a photoelectric conversion characteristic resulting from a DR compression processing according to a conventional technique.
Figure 24A:
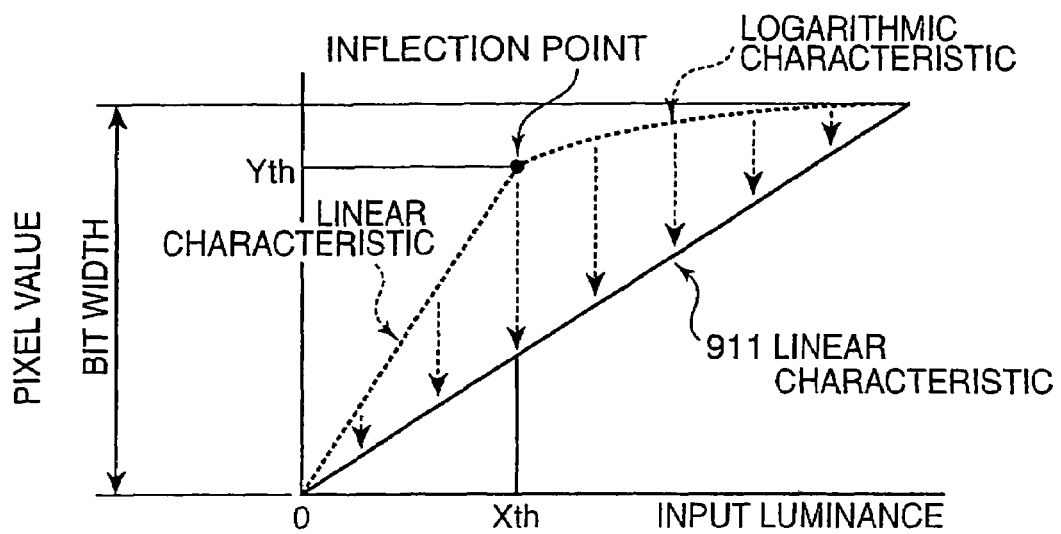
FIGS. 24A and 24B are explanatory graphs of changes in the photoelectric conversion characteristic resulting from the DR compression processing according to the conventional technique.
Figure 24B:
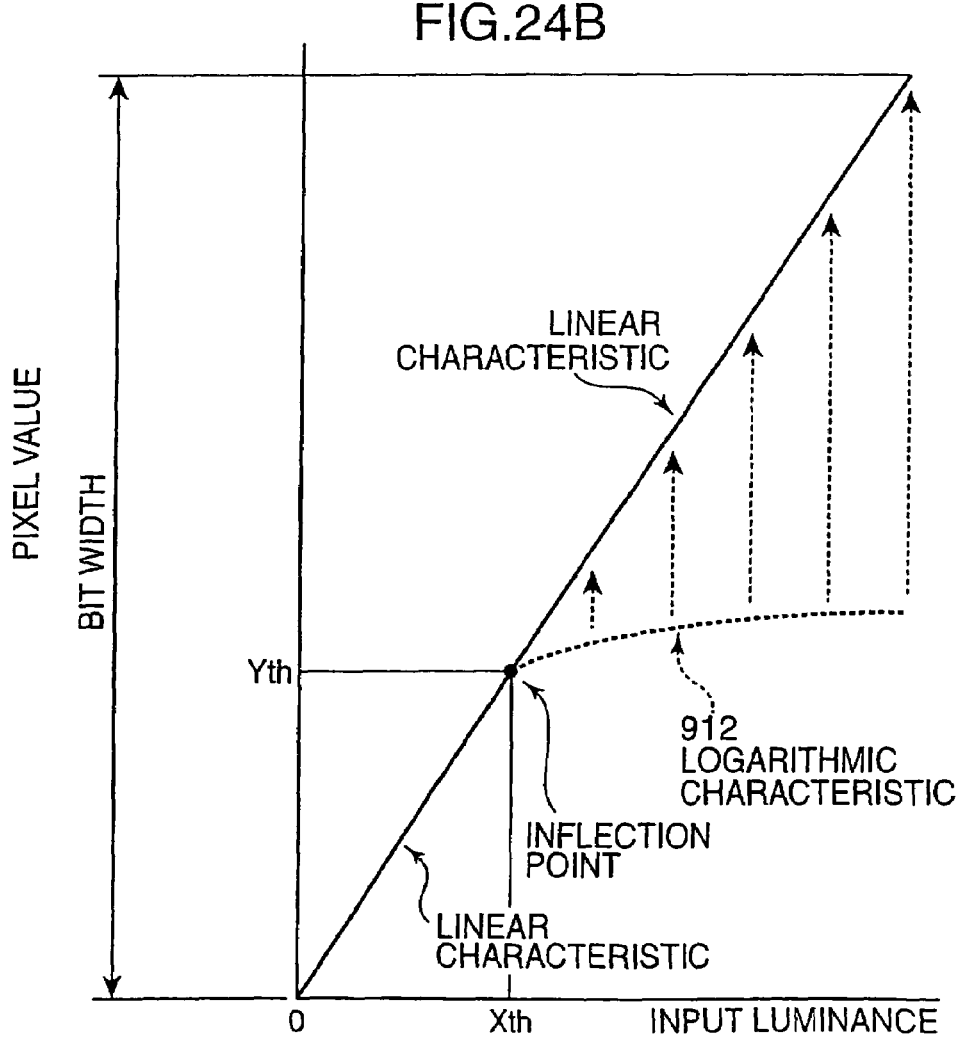

FIG. 21 is a flowchart showing one example of a DR compression processing in the tone transformation section 409a of the digital camera 1a according to the second embodiment. Firstly, a linear/logarithmic image is obtained through an image sensing operation of the image sensor 30 (Step S21). This linear/logarithmic image data is sent to the signal processing section 40. In the signal processing section 40, the linear/logarithmic image data are subjected to a given signal processing in each processing block, such as the analog signal processing section 401, and output to the tone transformation section 409a (Step S22). Then, the linear/logarithmic image (original image I) input in the tone transformation section 409a is segmented into an image I1 of a logarithmic characteristic region, and an image I2 of a linear characteristic region, on the basis of a boarder defined by a segmentation parameter θ (=Yth), and the images I1, I2 are extracted from the original image I, through the tone transformation section 409a (Step S23). Then, an illumination component Log(L1) in the logarithmic characteristic region image I1 is extracted through the illumination component extraction section 4092 (the extracted illumination component Log(L1) is subtracted from the image I1, through the subtracter, so as to obtain a reflectance component Log(R1)) (Step S24) Then, the illumination component Log(L1) extracted in Step S24 is subjected to a compression processing through the first illumination component compression section 4093, to be formed as Log(L1') Lb' (this compressed illumination component Log (L1') is added to the reflection component Log(R1) through an addition section 4096) so as to obtain an image I1' (Step S25).

An illumination component of an image I2 of a linear characteristic region is extracted through the second illumination component extraction section 720 (the extracted illumination component of an image I2 is divided by the image I2 through the divider 703 so as to obtain a reflectance component R2) (Step S26). Then, the illumination component L2 extracted in Step S24 is subjected to a compression processing through the second illumination component compression section 702, to be formed as illumination component L2' (this compressed illumination component Log L2' multiplied by the reflection component R2 through an multiplier 704) so as to obtain an image I2' (Step S27). Then, through image synthesis section 4094a, a synthetic image I' is produced based on the image I1' and image I2'. Then, a synthetic image O is produced based on the image I' and the original image I (through the syntheses method (a) to (c)) (Step S28). Then, the synthetic image O is output from the tone transformation section 409a to the image memory 411 and/or the LCD display 107 (Step S29).

As mentioned above, in the image sensing apparatus (digital camera 1, 1a) according to the first and second embodiments of the present invention, the illumination-component extractor 4092 (first illumination-component extraction section 4092, second illumination-component extraction section 701) extracts an illumination component (Log(L1), L2) from an original image I consisting of an image picked up by the image sensor 30 having the photoelectric conversion characteristic which comprises the linear characteristic region and the logarithmic characteristic region, and the subtracter 4095 (divider 703) (reflectance-component determiner) extracts a reflectance component (Log(R1), R2) from the original image. Then, the illumination component extraction section 4093 (first illumination component extraction section 4093, second illumination component extraction section 4093) (compressor) subjects to the dynamic compression processing at least an illumination component (Log(L1)) in the logarithmic characteristic region of the original image I, and the image syntheses section 4094 (4094a) produces a new image (synthetic image O) corresponding to the original image I, based on and the reflectance component, and the illumination component subjected to the dynamic compression processing. That is, at least an image area (illumination component) of the logarithmic characteristic region in the linear/logarithmic image obtained by the image sensor (LN/LOG sensor) is subjected to the DR compression processing. This makes it possible to provide improved (enhanced) contrast in the logarithmic characteristic region while maintaining contrast in the linear characteristic region (or while maintaining contrast without excessive highlighting or loss of contrast in the linear characteristic region, by keeping from subjecting the linear characteristic region to the DR compression processing or by subjecting the linear characteristic region to the DR compression processing in an appropriate manner), so as to achieve high-quality display onto a display system, etc., (higher image quality; improved image quality) of a picked-up image.

When the illumination-component extractor extracts the illumination component in the logarithmic characteristic region while using image information in a zone of the linear characteristic region adjacent to the logarithmic characteristic region. Thus, when the linear/logarithmic image is subjected to the DR compression processing, the image information about the zone of the linear characteristic region can be utilized to facilitate a processing of modifying a false contour which occurs at a boundary or border between the linear characteristic region and the logarithmic characteristic region (or to prevent occurrence of a false contour).

The compressor subjects to the dynamic compression processing the illumination component (Log(La), Lb) extracted from the logarithmic characteristic region and the partial linear characteristic region by the illumination component extractor. That is, a part of the linear characteristic region is subjected to the DR compression processing together with the logarithmic characteristic region. This makes it possible to modify (or prevent) a false contour which occurs or is likely to occur at a boundary or border between the linear characteristic region and the logarithmic characteristic region, during the DR compression processing. Further, during the process of producing (synthesizing) a synthetic image O based on the image I1' (compressed image) and the original image I, instead of simply replacing only a part of the original image I corresponding to the image I1' directly with the compressed image, the overlapping zone W is provided therebetween, and subjected to the given synthesis processing. This makes it possible to desirably (e.g. smoothly) connect the original image I (the linear characteristic region in the original image I; image $I_{LIN}$) and the image I1' (the linear characteristic region in the image I1').

The synthesis processing for the overlapping zone W is performed through the given weighted average processing (see FIG. 13). This makes it possible to connect the original image I and the image I1' together through the overlapping zone W, in a simple manner and with a high degree of accuracy (smoothly).

Each of the linear characteristic region and the logarithmic characteristic region in the original image I is subjected to the dynamic compression processing. This makes it possible to provide improved (enhanced) contrast in the logarithmic characteristic region and simultaneously adjust contrast in the linear/logarithmic image.

The original image I and the overall compressed image obtained by subjecting each of the linear characteristic region and the logarithmic characteristic region, or the entire photoelectric conversion characteristic, to the dynamic compression processing, are subjected to a given average processing (e.g. summing/averaging, averaging at a given ratio), to produce the new image. This makes it possible to obtain a synthetic image O consisting of the overall compressed image (image shown in conversion characteristic 802 in FIG. 17, 18, 10) and the original image I in a simplified synthesis processing.

The original image I (linear characteristic 801) on the side of the linear characteristic region on the basis of the border defined by the inflexion point, and the averaged image (conversion characteristic 804) obtained by subjecting the original image I and the image I' (the overall compressed image) on the side of the logarithmic characteristic region on the basis of the border defined by inflexion point (Xth or Yth; see FIGS. 18 and 19) to the given average processing (e.g. averaging or an average at a given ratio), are synthesized to obtain the synthetic image O. This makes it possible to facilitate improving (changing) contrast in the logarithmic characteristic region while maintaining contrast in the linear characteristic region, during the process of subjecting each of the linear characteristic region and the logarithmic characteristic region to the dynamic compression processing.

The given weighted average processing is performed during the process of synthesizing the connection zones of the conversion characteristic 804 of the averaged image on the side of the logarithmic characteristic region and the linear characteristic 8011 of the original image I on the side of the linear characteristic region. (See FIG. 19) This makes it possible to connect the respective connection zones of the images (linear characteristic 8011 and conversion characteristic 804) in a simplified manner and with a high degree of accuracy (smoothly).

The original image I having a relatively low gain is selected (employed), and used for a portion of at least the linear characteristic region where image I' (the overall compressed image) has a greater gain than that of the original image.(see FIG. 20) This makes it possible to prevent excessive increase in gain which is likely to occur in the linear characteristic region of the synthetic image O produced based on the image I' and the original image I during the DR compression processing (to prevent contrast from being excessively highlighted or excessively brightened). In other words, this makes it possible to suppress deterioration in S/N ratio of an output image (synthetic image O) in the linear characteristic region so as to obtain an image having desirably adjusted contrast.

Further, in the image processing method (DR compression method; tone transformation method) according to the first and second embodiment of the present invention, in the first step, an illumination component (Log(L1), L2) is extracted from an original image consisting of an image picked up by the image sensor 30 having the photoelectric conversion characteristic which comprises the linear characteristic region and the logarithmic characteristic region, through the use of the illumination-component extraction section 4092 (first illumination-component extraction 4092, second illumination-component extraction 701). In the second step, a reflectance component (Log(R1), R2) is extracted from the original image I, through the use of the subtraction section 4095 (divider section 703) (the reflectance-component determiner). Then, in the third step, at least an illumination component (Log(L1)) in the logarithmic characteristic region of the original image I, are subjected to the dynamic compression processing, through the use of the illumination component compression section 4093 (first illumination component compression section 4093, second illumination component compression section 702) (compressor). In the fourth step, a new image (synthetic image O) corresponding to the original image I is produced based on and the reflectance component, and the illumination component subjected to the dynamic compression processing, through the use of the image synthetic section 4094 (4094a). That is, at least an image area (illumination component) of the logarithmic characteristic region in the linear/logarithmic image obtained by the image sensor 30 (LN/LOG sensor) is subjected to the DR compression processing. This makes it possible to provide improved (enhanced) contrast in the logarithmic characteristic region while maintaining contrast in the linear characteristic region (or while maintaining contrast without excessive highlighting or loss of contrast in the linear characteristic region, by keeping from subjecting the linear characteristic region to the DR compression processing or by subjecting the linear characteristic region to the DR compression processing in an appropriate manner), so as to achieve high-quality display onto a display system, etc., (higher image quality; improved image quality) of a picked-up image.

The present invention may be implemented as follows.

(A) In the above embodiments, when the segmentation parameter θ is θ=Yth and θ<Yth (one of these states is selected by user), the segmentation/extraction operation is performed. Either of the values (θ=Yth and θ<Yth) of the segmentation parameter θ may be predetermined as a fixed value. Then, during the DR compression processing, the segmentation/extraction processing may be performed according to the fixed value.

(B) In the above embodiments, the DR compression processing to an image (original image I) picked up by the image sensor 30 is performed inside the digital camera 1a or tone transformation section 409 (409a). The DR compression processing may be performed outside the camera. Specifically, the DR compression processing may be performed using a host having user interface (UI) (e.g. PC Personal Computer) or PDA personal Digital Assist)), which is connected with a digital camera 1 (1a) trough variorum means, for example, direct-connection means, such as USB, network-connection wireless-LAN or storages medium (memory card 108).

In this case, an image before DR compression processing (tone transformation procession), for example, still-image or moving-image which is stored on an image memory 411 and compressed system control section 55, in the form of JPEG (including Motion-JPEG), MPEG or RAW format image is transmitted or sent to a host together with information about inflexion point of photoelectric conversion characteristic obtained by a digital camera (1a), in the form of receives still-image or moving image.

The host receives the image data, and displays the image information (inflexion point) on a monitor display using a given application software (viewer software).

Then, according to the application software, and in response to user's instruction signal (operation), a DE compressing operation (e.g. synthesizing at overlapping zone W as shown in FIG. 12; synthesizing of images I, I' as shown in FIGS. 17, 18 and 20) is selected to produce DR compression processing (image conversion processing) LUT so as to perform a DR compression processing. The information about inflexion point of photoelectric conversion characteristic may be described in an Exif header which is typically included in an image file of a digital camera adapted to rescore internal information of the camera, or may be separately described in information file dedicated to inflexion point information.

As described above, an image sensing apparatus is designed to subject a given image to a dynamic range compression processing. The image sensing apparatus comprises: an image sensor adapted to generate an electric signal depending on an incident light quantity, and have a photoelectric conversion characteristic which comprises a linear characteristic region where an electric signal is output therefrom while being transformed linearly relative to an incident light, and a logarithmic characteristic region where an electric signal is output therefrom while being transformed logarithmically relative to the incident light; an illumination-component extractor for extracting an illumination component illuminating a surface of an object, from an original image consisting of an image picked up by the image sensor; a reflectance-component determiner for determining a reflectance component of the object surface based on the original image and the illumination component; a compressor for subjecting the illumination component to the dynamic compression processing; and an image producer for producing a new image corresponding to the original image, based on the illumination component subjected to the dynamic compression processing by the compressor, and the reflectance component extracted by the reflectance-component determiner. The compressor is operable to subject to the dynamic compression processing at least an illumination component in the logarithmic characteristic region of the original image.

In the image sensing apparatus, the illumination-component extractor extracts an illumination component from an original image consisting of an image picked up by the image sensor having the photoelectric conversion characteristic which comprises the linear characteristic region and the logarithmic characteristic region, and the reflectance-component determiner extracts a reflectance component from the original image. Then, the compressor subjects to the dynamic compression processing at least an illumination component in the logarithmic characteristic region of the original image, and the image producer produces a new image corresponding to the original image, based on and the reflectance component, and the illumination component subjected to the dynamic compression processing. That is, at least an image area (illumination component) of the logarithmic characteristic region in the linear/logarithmic image obtained by the image sensor (LN/LOG sensor) is subjected to the DR compression processing. This makes it possible to provide improved (enhanced) contrast in the logarithmic characteristic region while maintaining contrast in the linear characteristic region (or while maintaining contrast without excessive highlighting or loss of contrast in the linear characteristic region, by keeping from subjecting the linear characteristic region to the DR compression processing or by subjecting the linear characteristic region to the DR compression processing in an appropriate manner), so as to achieve high-quality display onto a display system, etc., (higher image quality; improved image quality) of a picked-up image.

In the image sensing apparatus, the illumination-component extractor may be operable, when extracting the illumination component in the logarithmic characteristic region, to use image information in a zone of the linear characteristic region adjacent to the logarithmic characteristic region. According to this first specific feature, the illumination-component extractor extracts the illumination component in the logarithmic characteristic region while using image information in a zone of the linear characteristic region adjacent to the logarithmic characteristic region. Thus, when the linear/logarithmic image is subjected to the DR compression processing, the image information about the zone of the linear characteristic region can be utilized to facilitate a processing of modifying a false contour which occurs at a boundary or border between the linear characteristic region and the logarithmic characteristic region (or to prevent occurrence of a false contour).

In the image sensing apparatus, the illumination-component extractor may be operable to extract the illumination component in the logarithmic characteristic region and a partial linear characteristic region consisting of a part of the linear characteristic region, and the compressor may be operable to subject the illumination component extracted from the logarithmic characteristic region and the partial linear characteristic region, to the dynamic compression processing. Further, the image producer may be operable, based on the original image and a compressed image obtained by subjecting the illumination component extracted from the logarithmic characteristic region and the partial linear characteristic region to the dynamic compression processing, to produce the new image while subjecting an overlapping zone between the respective linear characteristic regions of the compressed image and the original image to a given synthesis processing. According to this second specific feature, the compressor subjects to the dynamic compression processing the illumination component extracted from the logarithmic characteristic region and the partial linear characteristic region by the illumination-component extractor. That is, a part of the linear characteristic region is subjected to the DR compression processing together with the logarithmic characteristic region. This makes it possible to modify (or prevent) a false contour which occurs or is likely to occur at a boundary or border between the linear characteristic region and the logarithmic characteristic region, during the DC compression processing. Further, during the process of producing (synthesizing) a new image based on the compressed image and the original image, instead of simply replacing only a part of the original image corresponding to the compressed image directly with the compressed image, the overlapping zone is provided therebetween, and subjected to the given synthesis processing. This makes it possible to desirably (e.g. smoothly) connect the original image (connection zone of the linear characteristic region in the original image) and the compressed image (connection zone of the linear characteristic region in the compressed image).

Further, the synthesis processing for the overlapping zone may be a given weighted average processing. According to this third specific feature, the synthesis processing for the overlapping zone is performed through the given weighted average processing. This makes it possible to connect the images (the original image and the compressed image) together through the overlapping zone, in a simple manner and with a high degree of accuracy (smoothly).

In the image sensing apparatus, the compressor may be operable to subject each of the linear characteristic region and the logarithmic characteristic region in the original image to the dynamic compression processing. According to this fourth specific feature, each of the linear characteristic region and the logarithmic characteristic region in the original image is subjected to the dynamic compression processing. This makes it possible to provide improved (enhanced) contrast in the logarithmic characteristic region and simultaneously adjust contrast in the linear/logarithmic image.

Further, the image producer may be operable, based on the original image and an overall compressed image obtained by subjecting each of the linear characteristic region and the logarithmic characteristic region to the dynamic compression processing, to produce the new image while subjecting the original image and the overall compressed image to a given average processing. According to this fifth specific feature, the original image and the overall compressed image obtained by subjecting each of the linear characteristic region and the logarithmic characteristic region, or the entire photoelectric conversion characteristic, to the dynamic compression processing, are subjected to a given average processing (e.g. summing/averaging), to produce the new image. This makes it possible to obtain a new image consisting of the overall compressed image and the original image in a simplified synthesis processing.

In the above image sensing apparatus having this fourth specific feature, the image producer may be operable to: subject the original image and a part in the logarithmic characteristic region of an overall compressed image to a given average processing to produce an averaged image, the logarithmic characteristic region being defined on the basis of a border of an inflexion point of the photoelectric conversion characteristic, the overall compressed image being obtained by subjecting each of the linear characteristic region and the logarithmic characteristic region to the dynamic compression processing; and synthesize the averaged image and a part in the linear characteristic region of the original image to produce a new image. According to this sixth specific feature, the part of the original image on the side of the linear characteristic region on the basis of the border defined by the inflexion point, and the averaged image obtained by subjecting the original image and a part of the overall compressed image on the side of the logarithmic characteristic region on the basis of the border to the given average processing (e.g. averaging or an average at a given ratio), are synthesized to obtain the new image. This makes it possible to facilitate improving (changing) contrast in the logarithmic characteristic region while maintaining contrast in the linear characteristic region, during the process of subjecting each of the linear characteristic region and the logarithmic characteristic region to the dynamic compression processing.

Further, the image producer may be operable to subject respective connection zones of the averaged image on the side of the logarithmic characteristic region and the part of the original image on the side of the linear characteristic region to a given weighted average processing, so as to synthesize the connection zones. According to this seventh specific feature, the given weighted average processing is performed during the process of synthesizing the connection zones of the averaged image on the side of the logarithmic characteristic region and the part of the original image on the side of the linear characteristic region. This makes it possible to connect the respective connection zones of the images (the original image and the averaged image) in a simplified manner and with a high degree of accuracy (smoothly).

In the above image sensing apparatus having the fourth specific feature, the image producer may be operable, based on the original image and an overall compressed image obtained by subjecting each of the linear characteristic region and the logarithmic characteristic region to the dynamic compression processing, to produce the new image while selecting the original image when the overall compressed image has a greater gain in at least the linear characteristic region than that of the original image. According to this eighth specific feature, during the process of producing the new image by the image producer, the original image having a relatively low gain is selected (employed), and used for a portion of at least the linear characteristic region where the overall compressed image has a greater gain (highlight ratio: the number of pixels to input luminance) than that of the original image. This makes it possible to prevent excessive increase in gain which is likely to occur in the linear characteristic region of the new image produced based on the overall compressed image and the original image during the DR compression processing (to prevent contrast from being excessively highlighted or excessively brightened). In other words, this makes it possible to suppress deterioration in S/N ratio of an output image (produced image) in the linear characteristic region so as to obtain an image having desirably adjusted contrast.

Also, an image sensing apparatus comprises: an image sensor adapted to generate an electric signal depending on an incident light quantity, and have a photoelectric conversion characteristic which comprises a first region where an electric signal is output therefrom while being changed relative to the incident light at a first rate, and a second region where an electric signal is output therefrom while being changed relative to the incident light at a second rate which is less than the first rate; an illumination-component extractor for extracting an illumination component illuminating a surface of an object, from an original image consisting of an image picked up by the image sensor; a reflectance-component determiner for determining a reflectance component of the object surface based on the original image and the illumination component; a compressor for subjecting the illumination component to the dynamic compression processing; and an image producer for producing a new image corresponding to the original image, based on the illumination component subjected to the dynamic compression processing by the compressor, and the reflectance component extracted by the reflectance-component determiner. The compressor is operable to subject to the dynamic compression processing at least an illumination component in the second region of the original image.

Further, an image processing method is adapted to subject a given image to a dynamic range compression processing, which comprises: a first step of extracting an illumination component illuminating a surface of an object, from an original image consisting of an image picked up by an image sensor, the image sensor being adapted to generate an electric signal depending on an incident light quantity and having a photoelectric conversion characteristic which comprises a linear characteristic region where an electric signal is output therefrom while being transformed linearly relative to an incident light, and a logarithmic characteristic region where an electric signal is output therefrom while being transformed logarithmically relative to the incident light; a second step of determining a reflectance component of the object surface based on the original image and the illumination component; a third step of subjecting the illumination component to the dynamic compression processing; and a fourth step of producing a new image corresponding to the original image, based on the illumination component subjected to the dynamic compression processing, and the reflectance component. The third step includes subjecting to the dynamic compression processing at least an illumination component in the logarithmic characteristic region of the original image.

In the image processing method, in the first step, an illumination component is extracted from an original image consisting of an image picked up by the image sensor having the photoelectric conversion characteristic which comprises the linear characteristic region and the logarithmic characteristic region. In the second step, a reflectance component is extracted from the original image. Then, in the third step, at least an illumination component in the logarithmic characteristic region of the original image, are subjected to the dynamic compression processing. In the fourth step, a new image corresponding to the original image is produced based on and the reflectance component, and the illumination component subjected to the dynamic compression processing. That is, at least an image area (illumination component) of the logarithmic characteristic region in the linear/logarithmic image obtained by the image sensor (LN/LOG sensor) is subjected to the DR compression processing. This makes it possible to provide improved (enhanced) contrast in the logarithmic characteristic region while maintaining contrast in the linear characteristic region (or while maintaining contrast without excessive highlighting or loss of contrast in the linear characteristic region, by keeping from subjecting the linear characteristic region to the DR compression processing or by subjecting the linear characteristic region to the DR compression processing in an appropriate manner), so as to achieve high-quality display onto a display system, etc., (higher image quality; improved image quality) of a picked-up image.

In the image processing method, the first step may include, when extracting the illumination component in the logarithmic characteristic region, using image information in a zone of the linear characteristic region adjacent to the logarithmic characteristic region. According to this first specific feature, image information in a zone of the linear characteristic region adjacent to the logarithmic characteristic region is used during extraction of the illumination component in the logarithmic characteristic region. Thus, when the linear/logarithmic image is subjected to the DR compression processing, the image information about the zone of the linear characteristic region can be utilized to facilitate a processing of modifying a false contour which occurs at a boundary or border between the linear characteristic region and the logarithmic characteristic region (or to prevent occurrence of a false contour).

In the image processing method, the first step may include extracting the illumination component in the logarithmic characteristic region and a partial linear characteristic region consisting of a part of the linear characteristic region; and the third step may include subjecting the illumination component extracted from the logarithmic characteristic region and the partial linear characteristic region, to the dynamic compression processing. Further, the fourth step may include, based on the original image and a compressed image obtained by subjecting the illumination component extracted from the logarithmic characteristic region and the partial linear characteristic region to the dynamic compression processing, subjecting an overlapping zone between the respective linear characteristic regions of the compressed image and the original image to a given synthesis processing, so as to produce the new image. According to this second specific feature, the illumination component extracted from the logarithmic characteristic region and the partial linear characteristic region by the illumination-component extractor is subjected to the dynamic compression processing. That is, a part of the linear characteristic region is subjected to the DR compression processing together with the logarithmic characteristic region. This makes it possible to modify (or prevent) a false contour which occurs or is likely to occur at a boundary or border between the linear characteristic region and the logarithmic characteristic region, during the DC compression processing. Further, during the process of producing (synthesizing) a new image based on the compressed image and the original image, instead of simply replacing only a part of the original image corresponding to the compressed image directly with the compressed image, the overlapping zone is provided therebetween, and subjected to the given synthesis processing. This makes it possible to desirably (e.g. smoothly) connect the original image (connection zone of the linear characteristic region in the original image) and the compressed image (connection zone of the linear characteristic region in the compressed image).

In the image processing method, the third step may include subjecting each of the linear characteristic region and the logarithmic characteristic region in the original image to the dynamic compression processing. According to this third specific feature, each of the linear characteristic region and the logarithmic characteristic region in the original image is subjected to the dynamic compression processing. This makes it possible to provide improved (enhanced) contrast in the logarithmic characteristic region and simultaneously adjust contrast in the linear/logarithmic image.

Further, the fourth step may include, based on the original image and an overall compressed image obtained by subjecting each of the linear characteristic region and the logarithmic characteristic region to the dynamic compression processing, producing the new image while subjecting the original image and the overall compressed image to a given weighted average processing. According to this fourth specific feature, the original image and the overall compressed image obtained by subjecting each of the linear characteristic region and the logarithmic characteristic region, or the entire photoelectric conversion characteristic, to the dynamic compression processing, are subjected to a given average processing (e.g. summing/averaging), to produce the new image. This makes it possible to obtain a new image consisting of the overall compressed image and the original image in a simplified synthesis processing.

In the image processing method having the third specific feature, fourth step may include subjecting the original image and a part in the logarithmic characteristic region of an overall compressed image to a given average processing to produce an averaged image, the logarithmic characteristic region being defined on the basis of a border of an inflexion point of the photoelectric conversion characteristic, the overall compressed image being obtained by subjecting each of the linear characteristic region and the logarithmic characteristic region to the dynamic compression processing; and synthesizing the averaged image and a part in the linear characteristic region of the original image to produce a new image. According to this fifth specific feature, the part of the original image on the side of the linear characteristic region on the basis of the border defined by the inflexion point, and the averaged image obtained by subjecting the original image and a part of the overall compressed image on the side of the logarithmic characteristic region on the basis of the border to the given average processing (e.g. averaging or an average at a given ratio), are synthesized to obtain the new image. This makes it possible to facilitate improving (changing) contrast in the logarithmic characteristic region while maintaining contrast in the linear characteristic region, during the process of subjecting each of the linear characteristic region and the logarithmic characteristic region to the dynamic compression processing.

In the image processing method having the third specific feature, the fourth step may include, based on the original image and an overall compressed image obtained by subjecting each of the linear characteristic region and the logarithmic characteristic region to the dynamic compression processing, producing the new image while selecting the original image when the overall compressed image has a greater gain in at least the linear characteristic region than that of the original image. According to this sixth specific feature, during the process of producing the new image by the image producer, the original image having a relatively low gain is selected (employed), and used for a portion of at least the linear characteristic region where the overall compressed image has a greater gain (highlight ratio: the number of pixels to input luminance) than that of the original image. This makes it possible to prevent excessive increase in gain which is likely to occur in the linear characteristic region of the new image produced based on the overall compressed image and the original image during the DR compression processing (to prevent contrast from being excessively highlighted or excessively brightened). In other words, this makes it possible to suppress deterioration in S/N ratio of an output image (produced image) in the linear characteristic region so as to obtain an image having desirably adjusted contrast.

Moreover, an image processing method comprises: a first step of extracting an illumination component illuminating a surface of an object, from an original image consisting of an image picked up by the image sensor, the image sensor being adapted to generate an electric signal depending on an incident light quantity, and having a photoelectric conversion characteristic which comprises a first region where an electric signal is output therefrom while being changed relative to the incident light at a first rate, and a second region where an electric signal is output therefrom while being changed relative to the incident light at a second rate which is less than the first rate; a second step of determining a reflectance component of the object surface based on the original image and the illumination component; a third step of subjecting the illumination component to the dynamic compression processing; and a fourth step of producing a new image corresponding to the original image, based on the illumination component subjected to the dynamic compression processing, and the reflectance component. The third step includes subjecting to the dynamic compression processing at least an illumination component in the second region of the original image.

As described above, in the image sensing apparatus, at least an image area (illumination component) of the logarithmic characteristic region in the linear/logarithmic image obtained by the image sensor is subjected to the DR compression processing. This makes it possible to provide improved (enhanced) contrast in the logarithmic characteristic region while maintaining contrast in the linear characteristic region in the linear/logarithmic image, so as to achieve high-quality display onto a display system, etc., (higher image quality; improved image quality) of a picked-up image.

In the image sensing apparatus having the first specific feature, the illumination-component extractor extracts the illumination component in the logarithmic characteristic region while using image information in a zone of the linear characteristic region adjacent to the logarithmic characteristic region. Thus, when the linear/logarithmic image is subjected to the DR compression processing, the image information about the zone of the linear characteristic region can be utilized to facilitate a processing of modifying a false contour which occurs at a boundary or border between the linear characteristic region and the logarithmic characteristic region (or to prevent occurrence of a false contour).

In the image sensing apparatus having the second specific feature, a part of the linear characteristic region is subjected to the DR compression processing together with the logarithmic characteristic region. This makes it possible to modify (or prevent) a false contour which occurs or is likely to occur at a border between the linear characteristic region and the logarithmic characteristic region, during the DC compression processing. Further, during the process of producing (synthesizing) a new image based on the compressed image and the original image, instead of simply replacing only a part of the original image corresponding to the compressed image directly with the compressed image, the overlapping zone is provided therebetween, and subjected to the given synthesis processing. This makes it possible to desirably (e.g. smoothly) connect the original image (connection zone of the linear characteristic region in the original image) and the compressed image (connection zone of the linear characteristic region in the compressed image).

In the image sensing apparatus having the third specific feature, the synthesis processing for the overlapping zone is performed through the given weighted average processing. This makes it possible to connect the images (the original image and the compressed image) together through the overlapping zone, in a simple manner and with a high degree of accuracy (smoothly).

In the image sensing apparatus having the fourth specific feature, each of the linear characteristic region and the logarithmic characteristic region in the original image is subjected to the dynamic compression processing. This makes it possible to provide improved (enhanced) contrast in the logarithmic characteristic region and simultaneously adjust contrast in the linear/logarithmic image.

In the image sensing apparatus having the fifth specific feature, the original image and the overall compressed image obtained by subjecting each of the linear characteristic region and the logarithmic characteristic region, or the entire photoelectric conversion characteristic, to the dynamic compression processing, are subjected to a given average processing (e.g. summing/averaging), to produce the new image. This makes it possible to obtain a new image consisting of the overall compressed image and the original image in a simplified synthesis processing.

In the image sensing apparatus having the sixth specific feature, the part of the original image on the side of the linear characteristic region on the basis of the border defined by the inflexion point, and the averaged image obtained by subjecting the original image and a part of the overall compressed image on the side of the logarithmic characteristic region on the basis of the border to the given average processing (e.g. averaging or an average at a given ratio), are synthesized to obtain the new image. This makes it possible to facilitate improving (changing) contrast in the logarithmic characteristic region while maintaining contrast in the linear characteristic region, during the process of subjecting each of the linear characteristic region and the logarithmic characteristic region to the dynamic compression processing.

In the image sensing apparatus having the seventh specific feature, the given weighted average processing is performed during the process of synthesizing the connection zones of the averaged image on the side of the logarithmic characteristic region and the part of the original image on the side of the linear characteristic region. This makes it possible to connect the respective connection zones of the images (the original image and the averaged image) in a simplified manner and with a high degree of accuracy (smoothly).

In the image sensing apparatus having the eighth specific feature, during the process of producing the new image by the image producer, the original image having a relatively low gain is selected (employed), and used for a portion of at least the linear characteristic region where the overall compressed image has a greater gain than that of the original image. This makes it possible to prevent excessive increase in gain which is likely to occur in the linear characteristic region of the new image produced based on the overall compressed image and the original image during the DR compression processing. In other words, this makes it possible to suppress deterioration in S/N ratio of an output image (produced image) in the linear characteristic region so as to obtain an image having desirably adjusted contrast.

In the image processing method, at least an image area (illumination component) of the logarithmic characteristic region in the linear/logarithmic image obtained by the image sensor (LN/LOG sensor) is subjected to the DR compression processing. This makes it possible to provide improved (enhanced) contrast in the logarithmic characteristic region while maintaining contrast in the linear characteristic region in the linear/logarithmic image, so as to achieve high-quality display onto a display system, etc., (higher image quality; improved image quality) of a picked-up image.

In the image processing method having the first specific feature, image information in a zone of the linear characteristic region adjacent to the logarithmic characteristic region is used during extraction of the illumination component in the logarithmic characteristic region. Thus, when the linear/logarithmic image is subjected to the DR compression processing, the image information about the zone of the linear characteristic region can be utilized to facilitate a processing of modifying a false contour which occurs at a boundary or border between the linear characteristic region and the logarithmic characteristic region (or to prevent occurrence of a false contour).

In the image processing method having the second specific feature, a part of the linear characteristic region is subjected to the DR compression processing together with the logarithmic characteristic region. This makes it possible to modify (or prevent) a false contour which occurs or is likely to occur at a boundary or border between the linear characteristic region and the logarithmic characteristic region, during the DC compression processing. Further, during the process of producing (synthesizing) a new image based on the compressed image and the original image, instead of simply replacing only a part of the original image corresponding to the compressed image directly with the compressed image, the overlapping zone is provided therebetween, and subjected to the given synthesis processing. This makes it possible to desirably (e.g. smoothly) connect the original image (connection zone of the linear characteristic region in the original image) and the compressed image (connection zone of the linear characteristic region in the compressed image).

In the image processing method having the third specific feature, each of the linear characteristic region and the logarithmic characteristic region in the original image is subjected to the dynamic compression processing. This makes it possible to provide improved (enhanced) contrast in the logarithmic characteristic region and simultaneously adjust contrast in the linear/logarithmic image.

In the image processing method having the fourth specific feature, the original image and the overall compressed image obtained by subjecting each of the linear characteristic region and the logarithmic characteristic region, or the entire photoelectric conversion characteristic, to the dynamic compression processing, are subjected to a given average processing (e.g. summing/averaging), to produce the new image. This makes it possible to obtain a new image consisting of the overall compressed image and the original image in a simplified synthesis processing.

In the image processing method having the fifth specific feature, the part of the original image on the side of the linear characteristic region on the basis of the border defined by the inflexion point, and the averaged image obtained by subjecting the original image and a part of the overall compressed image on the side of the logarithmic characteristic region on the basis of the border to the given average processing (e.g. averaging or an average at a given ratio), are synthesized to obtain the new image. This makes it possible to facilitate improving (changing) contrast in the logarithmic characteristic region while maintaining contrast in the linear characteristic region, during the process of subjecting each of the linear characteristic region and the logarithmic characteristic region to the dynamic compression processing.

In the image processing method having the sixth specific feature, during the process of producing the new image by the image producer, the original image having a relatively low gain is selected (employed), and used for a portion of at least the linear characteristic region where the overall compressed image has a greater gain than that of the original image. This makes it possible to prevent excessive increase in gain which is likely to occur in the linear characteristic region of the new image produced based on the overall compressed image and the original image during the DR compression processing. In other words, this makes it possible to suppress deterioration in S/N ratio of an output image (produced image) in the linear characteristic region so as to obtain an image having desirably adjusted contrast.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An image sensing apparatus designed to subject a given image to a dynamic range compression processing, comprising:

an image sensor adapted to generate an electric signal depending on an incident light quantity, and have a photoelectric conversion characteristic which comprises a first region where an electric signal is output therefrom while being changed relative to the incident light at a first rate, and a second region where an electric signal is output therefrom while being changed relative to the incident light at a second rate which is less than the first rate;

an illumination-component extractor for extracting an illumination component illuminating a surface of an object, from an original image consisting of an image picked up by the image sensor;

a reflectance-component determiner for determining a reflectance component of the object surface based on the original image and the illumination component;

a compressor for subjecting the illumination component to the dynamic compression processing; and an image producer for producing a new image corresponding to the original image, based on the illumination component subjected to the dynamic compression processing by the compressor, and the reflectance component extracted by the reflectance-component determiner, wherein the compressor is operable to subject to the dynamic compression processing at least an illumination component in the second region of the original image.

2. The image sensing apparatus as defined in claim 1, wherein the illumination-component extractor is operable, when extracting the illumination component in the second region, to use image information in a zone of the first region adjacent to the second region.

3. The image sensing apparatus as defined in claim 1, wherein:

the illumination-component extractor is operable to extract the illumination component in the second region and a partial first region consisting of a part of the first region;

the compressor is operable to subject the illumination component extracted from the second region and the partial first region, to the dynamic compression processing; and the image producer is operable, based on the original image and a compressed image obtained by subjecting the illumination component extracted from the second region and the partial first region to the dynamic compression processing, to produce the new image while subjecting an overlapping zone between the respective first regions of the compressed image and the original image to a given synthesis processing.

4. The image sensing apparatus as defined in claim 3, wherein the synthesis processing for the overlapping zone is a given weighted average processing.

5. The image sensing apparatus as defined in claim 1, wherein the compressor is operable to subject each of the first region and the second region in the original image to the dynamic compression processing.

6. The image sensing apparatus as defined in claim 5, wherein the image producer is operable, based on the original image and an overall compressed image obtained by subjecting each of the first region and the second region to the dynamic compression processing, to produce the new image while subjecting the original image and the overall compressed image to a given average processing.

7. The image sensing apparatus as defined in claim 5, wherein the image producer is operable to:
subject the original image and a part in the second region of an overall compressed image to a given average processing to produce an averaged image, the second region being defined on the basis of a border of an inflexion point of the photoelectric conversion characteristic, the overall compressed image being obtained by subjecting each of the first region and the second region to the dynamic compression processing; and
to synthesize the averaged image and a part in the first region of the original image to produce a new image.

8. The image sensing apparatus as defined in claim 7, wherein the image producer is operable to subject respective connection zones of the averaged image on the side of the second region and the part of the original image on the side of the first region to a given weighted average processing, so as to synthesize the connection zones.

9. The image sensing apparatus as defined in claim 5, wherein the image producer is operable, based on the original image and an overall compressed image obtained by subjecting each of the first region and the second region to the dynamic compression processing, to produce the new image while selecting the original image when the overall compressed image has a greater gain in at least the first region than that of the original image.

10. An image sensing apparatus designed to subject a given image to a dynamic range compression processing, comprising:
an image sensor adapted to generate an electric signal depending on an incident light quantity, and have a photoelectric conversion characteristic which comprises a linear characteristic region where an electric signal is output therefrom while being transformed linearly relative to an incident light, and a logarithmic characteristic region where an electric signal is output therefrom while being transformed logarithmically relative to the incident light;
an illumination-component extractor for extracting an illumination component illuminating a surface of an object, from an original image consisting of an image picked up by the image sensor;
a reflectance-component determiner for determining a reflectance component of the object surface based on the original image and the illumination component;
a compressor for subjecting the illumination component to the dynamic compression processing; and
an image producer for producing a new image corresponding to the original image, based on the illumination component subjected to the dynamic compression processing by the compressor, and the reflectance component extracted by the reflectance-component determiner,
wherein the compressor is operable to subject to the dynamic compression processing at least an illumination component in the logarithmic characteristic region of the original image.

11. An image processing method adapted to subject a given image to a dynamic range compression processing, comprising:
a first step of extracting an illumination component illuminating a surface of an object, from an original image consisting of an image picked up by an image sensor, the image sensor being adapted to generate an electric signal depending on an incident light quantity, and having a photoelectric conversion characteristic which comprises a first region where an electric signal is output therefrom while being changed relative to the incident light at a first rate, and a second region where an electric signal is output therefrom while being changed relative to the incident light at a second rate which is less than the first rate;
a second step of determining a reflectance component of the object surface based on the original image and the illumination component;
a third step of subjecting the illumination component to the dynamic compression processing; and
a fourth step of producing a new image corresponding to the original image, based on the illumination component subjected to the dynamic compression processing, and the reflectance component,
wherein the third step includes subjecting to the dynamic compression processing at least an illumination component in the second region of the original image.

12. The image processing method as defined in claim 11, wherein the first step includes, when extracting the illumination component in the second region, using image information in a zone of the first region adjacent to the second region.

13. The image processing method as defined in claim 11, wherein:
the first step includes extracting the illumination component in the second region and a partial first region consisting of a part of the first region;
the third step includes subjecting the illumination component extracted from the second region and the partial first region, to the dynamic compression processing; and
the fourth step includes, based on the original image and a compressed image obtained by subjecting the illumination component extracted from the second region and the partial first region to the dynamic compression processing, producing the new image while subjecting an overlapping zone between the respective first regions of the compressed image and the original image to a given synthesis processing.

14. The image processing method as defined in claim 11, wherein the third step includes subjecting each of the first region and the second region in the original image to the dynamic compression processing.

15. The image processing method as defined in claim 14, wherein the fourth step includes, based on the original image and an overall compressed image obtained by subjecting each of the first region and the second region to the dynamic compression processing, producing the new image while subjecting the original image and the overall compressed image to a given weighted average processing.

16. The image processing method as defined in claim 14, wherein the fourth step includes subjecting the original image and a part in the second region of an overall compressed image to a given average processing to produce an averaged image, the second region being defined on the basis of a border of an inflexion point of the photoelectric conversion characteristic, the overall compressed image being obtained by subjecting each of the first region and the second region to the dynamic compression processing, and synthesizing the averaged image and a part in the first region of the original image to produce a new image.

17. The image processing method as defined in claim 14, wherein the fourth step includes, based on the original image and an overall compressed image obtained by subjecting each of the first region and the second region to the dynamic compression processing, producing the new image while selecting the original image when the overall compressed image has a greater gain in at least the first region than that of the original image.

18. An image processing method adapted to subject a given image to a dynamic range compression processing, comprising:
- a first step of extracting an illumination component illuminating a surface of an object, from an original image consisting of an image picked up by an image sensor, the image sensor being adapted to generate an electric signal depending on an incident light quantity and having a photoelectric conversion characteristic which comprises a linear characteristic region where an electric signal is output therefrom while being transformed linearly relative to an incident light, and a logarithmic characteristic region where an electric signal is output therefrom while being transformed logarithmically relative to the incident light;
- a second step of determining a reflectance component of the object surface based on the original image and the illumination component; a third step of subjecting the illumination component to the dynamic compression processing; and
- a fourth step of producing a new image corresponding to the original image, based on the illumination component subjected to the dynamic compression processing, and the reflectance component,
- wherein the third step includes subjecting to the dynamic compression processing at least an illumination component in the logarithmic characteristic region of the original image.

\* \* \* \* \*